(12) United States Patent
Hatakeyama et al.

(10) Patent No.: US 9,847,544 B2
(45) Date of Patent: Dec. 19, 2017

(54) ION CONDUCTIVE ORGANIC-INORGANIC COMPOSITE PARTICLES, PARTICLE-CONTAINING RESIN COMPOSITION AND ION CONDUCTIVE MOLDED ARTICLE

(75) Inventors: Yoshiharu Hatakeyama, Osaka (JP); Hideyuki Emori, Osaka (JP); Hiroyuki Nishii, Osaka (JP); Junichi Nagase, Osaka (JP); Shusaku Shibata, Osaka (JP); Saori Fukuzaki, Osaka (JP); Tatsuki Nagatsuka, Osaka (JP); Takahiro Fukuoka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/640,434

(22) PCT Filed: Apr. 11, 2011

(86) PCT No.: PCT/JP2011/059033
§ 371 (c)(1),
(2), (4) Date: Feb. 22, 2013

(87) PCT Pub. No.: WO2011/129308
PCT Pub. Date: Oct. 20, 2011

(65) Prior Publication Data
US 2013/0266886 A1    Oct. 10, 2013

(30) Foreign Application Priority Data

Apr. 12, 2010 (JP) ................................. 2010-091577
Apr. 7, 2011 (JP) ................................. 2011-085735

(51) Int. Cl.
*H01M 8/10* (2016.01)
*H01M 8/1048* (2016.01)
(Continued)

(52) U.S. Cl.
CPC .......... *H01M 8/1048* (2013.01); *B82Y 30/00* (2013.01); *C01G 23/047* (2013.01); *C08J 3/128* (2013.01);
(Continued)

(58) Field of Classification Search
None
See application file for complete search history.

(56) References Cited

U.S. PATENT DOCUMENTS 4,192,792 A    3/1980 Sugerman et al.
4,874,806 A    10/1989 Kay et al.
(Continued)

FOREIGN PATENT DOCUMENTS

CN    1389527 A    1/2003
CN    1455933 A    11/2003
(Continued)

OTHER PUBLICATIONS

Ohio State. "From Moles to Milliequivalents". http://www.vet.ohio-state.edu/assets/courses/vm613/part7/part7.html. Mar. 2015. p. 1-2.*

(Continued)

*Primary Examiner* — Miriam Stagg
*Assistant Examiner* — Christopher Domone
(74) *Attorney, Agent, or Firm* — Sughrue Mion, PLLC

(57) ABSTRACT

Ion conductive organic-inorganic composite particles are particles that have an organic group on the surface of inorganic particles and have at least a configuration that does not allow the inorganic particles to contact with each other by steric hindrance of the organic group, the organic group containing an ion conductive group.

7 Claims, 4 Drawing Sheets

(51) Int. Cl.
  *C08J 5/22* (2006.01)
  *H01M 8/1041* (2016.01)
  *C01G 23/047* (2006.01)
  *C08J 3/12* (2006.01)
  *C08J 3/14* (2006.01)
  *C08K 9/04* (2006.01)
  *B82Y 30/00* (2011.01)

(52) U.S. Cl.
  CPC .............. *C08J 3/14* (2013.01); *C08J 5/2206* (2013.01); *C08K 9/04* (2013.01); *H01M 8/1041* (2013.01); *C01P 2002/72* (2013.01); *C01P 2002/84* (2013.01); *C01P 2002/88* (2013.01); *C01P 2004/04* (2013.01); *C01P 2004/64* (2013.01); *C01P 2004/84* (2013.01); *H01M 2300/0091* (2013.01)

(56) References Cited

U.S. PATENT DOCUMENTS

| | | |
|---|---|---|
| 5,022,990 A | 6/1991 | Doi et al. |
| 5,712,045 A | 1/1998 | Miyai |
| 5,746,916 A | 5/1998 | Kamo et al. |
| 5,969,087 A | 10/1999 | Maeda |
| 6,761,879 B1 | 7/2004 | Finidori |
| 6,986,943 B1 | 1/2006 | Cook et al. |
| 7,169,832 B2 | 1/2007 | Poppe et al. |
| 8,541,591 B2* | 9/2013 | Kato et al. ............. 548/112 |
| 2001/0046944 A1 | 11/2001 | Ito |
| 2002/0069790 A1 | 6/2002 | Hayashi et al. |
| 2003/0056693 A1 | 3/2003 | Hayashi et al. |
| 2003/0116758 A1 | 6/2003 | Morii et al. |
| 2003/0151032 A1 | 8/2003 | Ito et al. |
| 2004/0101626 A1 | 5/2004 | Kanada et al. |
| 2004/0191549 A1 | 9/2004 | Ahn et al. |
| 2006/0020099 A1 | 1/2006 | Stengel et al. |
| 2007/0003463 A1* | 1/2007 | Ajiri ..................... 423/274 |
| 2007/0078215 A1 | 4/2007 | Yoon et al. |
| 2008/0085441 A1 | 4/2008 | Lee et al. |
| 2008/0152933 A1* | 6/2008 | Mizuno .............. C08K 9/04 428/480 |
| 2008/0160374 A1* | 7/2008 | Takagi .............. B01D 53/228 429/492 |
| 2008/0213646 A1* | 9/2008 | Takekawa et al. ............. 429/33 |
| 2009/0208806 A1* | 8/2009 | Izuhara et al. ................ 429/33 |
| 2009/0220840 A1* | 9/2009 | Yamaguchi et al. ........... 429/33 |
| 2010/0092663 A1 | 4/2010 | Ajiri |
| 2010/0304110 A1 | 12/2010 | Iida et al. |
| 2011/0144061 A1 | 6/2011 | Kato et al. |

FOREIGN PATENT DOCUMENTS

| | | |
|---|---|---|
| CN | 1543433 A | 11/2004 |
| EP | 1 975 136 A1 | 10/2008 |
| JP | 64-003002 A | 1/1989 |
| JP | 64-40490 A | 2/1989 |
| JP | 3-215535 A | 9/1991 |
| JP | 5-31341 A | 2/1993 |
| JP | 7-232044 A | 9/1995 |
| JP | 9-67405 A | 3/1997 |
| JP | 63-278944 A | 11/1998 |
| JP | 10-330482 A | 12/1998 |
| JP | 2000-185916 A | 7/2000 |
| JP | 2000-351787 A | 12/2000 |
| JP | 2002-331244 A | 11/2002 |
| JP | 2003-26850 | 1/2003 |
| JP | 2003-513011 A | 4/2003 |
| JP | 2003-261329 | 9/2003 |
| JP | 2003-292497 A | 10/2003 |
| JP | 2004-018477 A | 1/2004 |
| JP | 2004-35347 A | 2/2004 |
| JP | 2005-082756 A | 3/2005 |
| JP | 2005-170757 | 6/2005 |
| JP | 2005-193237 A | 7/2005 |
| JP | 2005-194148 A | 7/2005 |
| JP | 2006-21988 A | 1/2006 |
| JP | 2006-506416 A | 2/2006 |
| JP | 2006-131881 A | 5/2006 |
| JP | 2006-297209 A | 11/2006 |
| JP | 2007-099611 A | 4/2007 |
| JP | 2007-125821 A | 5/2007 |
| JP | 2007-206061 A | 8/2007 |
| JP | 2008-44835 A | 2/2008 |
| JP | 2008-091342 A | 4/2008 |
| JP | 2008-156390 A | 7/2008 |
| JP | 2008-303299 | 12/2008 |
| JP | 2009-067949 | 4/2009 |
| JP | 2009-073699 | 4/2009 |
| JP | 2009-73994 A | 4/2009 |
| JP | 2009-080440 | 4/2009 |
| JP | 2009-149713 A | 7/2009 |
| JP | 2009-167315 A | 7/2009 |
| JP | 2009-191167 A | 8/2009 |
| JP | 2009-268943 A | 11/2009 |
| JP | 2009-298945 A | 12/2009 |
| JP | 2010-023017 A | 2/2010 |
| JP | 2010-051952 A | 3/2010 |
| JP | 2011-515569 A | 5/2011 |
| WO | 2007/083786 A1 | 7/2007 |
| WO | 2008/010533 A1 | 1/2008 |
| WO | 2009/120846 A2 | 10/2009 |
| WO | 2009/127000 A1 | 10/2009 |
| WO | 2010/013822 A2 | 2/2010 |

OTHER PUBLICATIONS

U.S. Final Office Action issued in U.S. Appl. No. 13/084,843, dated Oct. 10, 2013.
Notification of First Office Action issued by the State Intellectual Property Office of P.R. China, dated Dec. 18, 2013 issued in CN Application 201110092651.4.
First Office Action dated Mar. 5, 2014, issued by the State Intellectual Property Office of the People's Republic of China in corresponding Application No. 201180018234.3.
Notification of Reasons for Refusal, dated Feb. 12, 2014, issued by the Japanese Patent Office, in Application No. 2010-172309, which corresponds to U.S. Appl. No. 13/640,911.
Notification of Reasons for Refusal issued in JP Application No. 2010-172306, dated Nov. 5, 2013.
Decision of Refusal dated Aug. 26, 2014, issued by the Japan Patent Office in Japanese Application No. 2010-172306, which corresponds to U.S. Appl. No. 13/084,943.
Final Office Action dated Jan. 12, 2015 from the United States Patent Office in U.S. Appl. No. 13/640,911.
Communication dated Nov. 4, 2014 from the State Intellectual Property Office of People's Republic of China in counterpart Chinese Patent Application No. 201180018234.3.
Notification of Reasons for Refusal dated Nov. 18, 2014 from the Japanese Patent Office in Japanese Patent Application No. 2011086701, which corresponds to which corresponds to U.S. Appl. No. 13/640,911.
U.S. Non-Final Office Action dated Aug. 4, 2014, issued in U.S. Appl. No. 13/640,911.
Imai, Y. et al., "Synthesis and characterization of high refractive index nanoparticle/poly (arylene ether ketone) nanocomposites", Polymer Journal 42, pp. 179-184, Published online Dec. 23, 2009.
Communication dated Jun. 19, 2014, from the State Intellectual Property Office of the People's Republic of China in Chinese Application No. 201110092651.4, which corresponds to U.S. Appl. No. 13/084,843.
Notification of Reasons for Refusal dated May 27, 2014, issued by the Japanese Patent Office in Application No. 2010-172310, which corresponds to U.S. Appl. No. 13/084,843.
Communication dated May 28, 2014, issued by the State Intellectual Property Office of the People's Republic of China in Application No. 201180017265.7, which corresponds to U.S. Appl. No. 13/640,911.

(56) References Cited

OTHER PUBLICATIONS

Tagaya et al., "Compensation of the Birefringence of a Polymer by a Birefringent Crystal", Science, Aug. 8, 2003, vol. 301, 3 total pages.
Notification of Reasons for Refusal dated Oct. 7, 2014 from the Japanese Patent Office in Japanese Patent Application No. 2010-172309, which corresponds to U.S. Appl. No. 13/640,911.
Non-Final Office Action dated Dec. 22, 2014 in U.S. Appl. No. 13/084,843.
Notification of the Third Office Action dated Jan. 4, 2015, issued by the State Intellectual Property Office of the People's Republic of China in corresponding Chinese Application No. 201110092651.4, which corresponds to U.S. Appl. No. 13/084,843.
Notification of Reasons for Refusal dated Feb. 3, 2015, issued by the Japanese Patent Office in Japanese application No. 2011-086371, which corresponds to U.S. Appl. No. 13/640,911.
K. Tomita et al., "A Water-Soluble Titanium Complex for the Selective Synthesis of Nanocrystalline Brookite, Rutile, and Anatase by a Hydrothermal Method", Angewandte Chemie International Edition, Apr. 3, 2006, vol. 45, Issue 15, 2378-2381.
Second Office Action dated Feb. 13, 2015, issued by the State Intellectual Property Office of P.R. China in Chinese application No. 201180017265.7, which corresponds to U.S. Appl. No. 13/640,911.
"Study on Preparation of Strontium Carbonate Particles and Controlling of Shapes by Homogeneous Precipitation Method", Haibin Wang et al., pp. 45-48.
Notification of Reasons for Refusal dated Feb. 10, 2015, issued by the Japanese Patent Office in Japanese application No. 2011-086803, which corresponds to U.S. Appl. No. 13/640,911.
Notification of reasons for Refusal dated Feb. 10, 2015, from the Japanese Patent Office in counterpart application No. 2012-510649.
Request form for inspection for a Submission of Publications dated May 14, 2015 to the Japanese Patent Office in application No. 2010-172309, which corresponds to U.S. Appl. No. 13/640,911.
The Complete Book of Dispersion Techniques (Publisher) Akitoshi Taniguchi (Publishing office) Johokiko Co., Ltd. (Issue date) Jul. 15, 2005, Corresponding sections (Chapter 2, Section 1 and 5).
Submission of Publications dated Dec. 24, 2014 submitted to the Japanese Patent Office in application No. 2010-172309, which corresponds to U.S. Appl. No. 13/640,911.
Notification Notifying a Submission of Publications dated Jan. 27, 2015 from the Japanese Patent Office in application No. 2010-172309, which corresponds to U.S. Appl. No. 13/640,911.
Non-Final Office Action dated Jun. 30, 2015, issued by the USPTO in U.S. Appl. No. 13/640,911.
Decision of Refusal dated Mar. 10, 2015 from the Japanese Patent Office in application No. 2010-172309, which corresponds to U.S. Appl. No. 13/640,911.
Notification of Reasons for Refusal dated Nov. 10, 2015 from the Japanese Patent Office in application No. 2014-23685, which corresponds to U.S. Appl. No. 13/084,843.
Final Office Action dated Dec. 14, 2015 from the United States Patent and Trademark Office in U.S. Appl. No. 13/084,843.
Notification of Reasons for Refusal dated Aug. 25, 2015 from the Japanese Patent Office in application No. 2011-086803, which corresponds to U.S. Appl. No. 13/640,911.
Decision of Rejection dated Dec. 1, 2015 from the State Intellectual Property Office of P.R. China in application No. 201110092651.4, which corresponds to U.S. Appl. No. 13/084,843.
Third Office Action dated May 11, 2015 from the State Intellectual Property Office of People's Republic of China in counterpart Application No. 201180018234.3.
Zhao et al., "Surface modification of $TiO_2$ by Phosphate: Effect on Photocatalytic Activity and Mechanism Implication", J. Phys. Chem. C 2008, 112, 5993-6001.
Final Office Action from United States Patent and Trademark Office dated Jul. 15, 2015 in U.S. Appl. No. 13/084,843.
Pretrial Report dated Dec. 1, 2015 from the Japanese Patent Office in application No. 2010-172309, which corresponds to U.S. Appl. No. 13/640,911.
Cancelation of Pre-trial Proceedings dated Dec. 1, 2015 from the Japanese Patent Office in application No. 2010-172309, which corresponds to U.S. Appl. No. 13/640,911.
Final Office Action dated Feb. 18, 2016 from the U.S. Patent and Trademark Office in U.S. Appl. No. 13/640,911.
Notification of Reasons for Refusal dated Oct. 13, 2015 from the Japanese Patent Office in application No. 2011-086371, which corresponds to U.S. Appl. No. 13/640,911.
Koji Tomita et al., "A Water-Soluble Titanium complex for the Selective synthesis of Nanocrystalline Brookite, Rutile, and Anatase by a Hydrothermal Method", Angew. Chem. Int. Edition, 2006, vol. 45, pp. 2378-2381.
Notification of Fourth Office Action dated Jun. 25, 2015, issued by the State Intellectual Property Office of the People's Republic of China in Application No. 201110092651.4, which corresponds to U.S. Appl. No. 13/084,843.
Non-Final Office Action dated Jan. 14, 2016, from the U.S. Patent and Trademark Office Action in U.S. Appl. No. 14/535,478.
First Office Action dated Apr. 14, 2016 from the State Intellectual Property Office of the P.R.C. in application No. 201410542267.3, which corresponds to U.S. Appl. No. 13/640,911.
Second Office Action dated Nov. 21, 2016, from the State Intellectual Property Office of People's Republic of China in Application No. 201410542267.3.
Non-Final Office Action from United States Patent and Trademark Office dated Sep. 6, 2016 in U.S. Appl. No. 13/640,911.
Third Office Action dated Jun. 13, 2017, from the State Intellectual Property Office of the P.R.C., in Chinese application No. 201410542267.3, which corresponds to U.S. Appl. No. 15/097,400.
U.S. Non-Final Office Action issued in U.S. Appl. No. 13/084,843, dated Apr. 12, 2013.
Akihiro Tagaya et al., "Compensation of the birefringence of a Polymer by a Birefringent Crystal", Science, 2003, pp. 812-824, vol. 301.
International Search Report for PCT/JP2011/059040 dated Jul. 19, 2011.

* cited by examiner

TEM micrograph
Example 17 (1,000,000 magnification)

20 nm

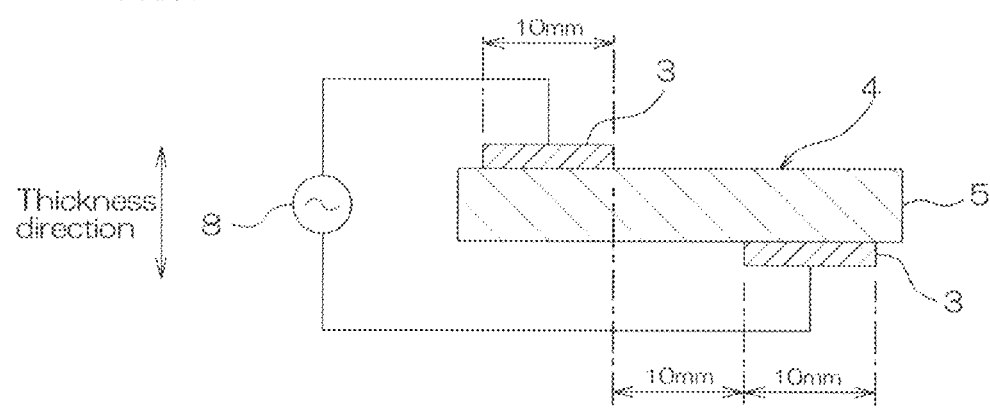

ION CONDUCTIVE ORGANIC-INORGANIC COMPOSITE PARTICLES, PARTICLE-CONTAINING RESIN COMPOSITION AND ION CONDUCTIVE MOLDED ARTICLE

CROSS REFERENCE TO RELATED APPLICATIONS

This application is a National Stage of International Application No. PCT/JP2011/059033 filed Apr. 11, 2011, claiming priority based on Japanese Patent Application Nos. 2010-091577, filed Apr. 12, 2010 and 2011-085735 filed Apr. 7, 2011, the contents of all of which are incorporated herein by reference in their entirety.

TECHNICAL FIELD

The present invention relates to ion conductive organic-inorganic composite particles, a particle-containing resin composition and an ion conductive molded article, and more particularly to an ion conductive molded article used in various industrial applications, a particle-containing resin composition for forming the ion conductive molded article, and ion conductive organic-inorganic composite particles contained in the particle-containing resin composition.

BACKGROUND ART

Conventionally, nanometer-sized particles (nanoparticles) are used in various industrial applications including energy applications.

For example, a method has been proposed in which an electrolyte membrane is obtained by applying and drying a composition prepared by blending inorganic nanoparticles having a proton conductive group bound thereto with a polymer and a solvent (see, for example, Patent Document 1 below).

CITATION LIST

Patent Documents

Patent Document 1: Japanese Unexamined Patent Publication No. 2008-91342

DISCLOSURE OF THE INVENTION

Problems to be Solved

However, inorganic nanoparticles are likely to coagulate because they have a large specific surface area and stabilize while reducing their high surface energy. Once coagulated, the inorganic nanoparticles are not easily dispersed, so it is necessary to perform a surface treatment on the coagulated inorganic nanoparticles, but it is difficult to carry out a surface treatment uniformly on the coagulated inorganic nanoparticles.

For this reason, when blended at a higher proportion relative to the polymer, the inorganic nanoparticles cannot exert the full effect of specific surface area that has been increased by forming the particles to have a nanometer size. That is, a problem arises due to the occurrence of coagulation, in that various physical properties such as proton conductivity decrease in the electrolyte membrane in which the inorganic nanoparticles are mixed with the polymer.

It is an object of the present invention to provide ion conductive organic-inorganic composite particles, a particle-containing resin composition and an ion conductive molded article that can form at least a path that easily conducts ions as a result of ion conductive organic groups present in close proximity to each other.

Means for Solving the Problem

Ion conductive organic-inorganic composite particles according to the present invention are particles that have an organic group on the surface of inorganic particles and have at least a configuration that does not allow the inorganic particles to contact with each other by steric hindrance of the organic group, the organic group containing an ion conductive group.

Also, with the ion conductive organic-inorganic composite particles of the present invention, it is preferable that the ion conductive group is a cation conductive group or an anion conductive group.

Also, with the ion conductive organic-inorganic composite particles of the present invention, it is preferable that the existing proportion of the ion conductive group is 0.01 to 10 (mmol/g).

Also, it is preferable that the ion conductive organic-inorganic composite particles of the present invention are obtained by hydrothermal synthesis.

A particle-containing resin composition according to the present invention contains a resin and ion conductive organic-inorganic composite particles mixed in the resin, the ion conductive organic-inorganic composite particles being particles having an organic group on the surface of inorganic particles and having at least a configuration that does not allow the inorganic particles to contact with each other by steric hindrance of the organic group, the organic group containing an ion conductive group.

An ion conductive molded article according to the present invention is an ion conductive molded article produced by molding a particle-containing resin composition containing a resin and ion conductive organic-inorganic composite particles mixed in the resin, the ion conductive organic-inorganic composite particles being particles having an organic group on the surface of inorganic particles and having at least a configuration that does not allow the inorganic particles to contact with each other by steric hindrance of the organic group, the organic group containing an ion conductive group.

Also, it is preferable that the ion conductive molded article of the present invention is an ion conductive film.

Effect of the Invention

Since the ion conductive organic-inorganic composite particles of the present invention have at least a configuration that does not allow inorganic particles to contact with each other by steric hindrance of an organic group that is present on the surface of the inorganic particles, and the organic group has an ion conductive group, it is possible to form a path in which the organic groups are in close proximity and that easily conducts ions.

Accordingly, in the ion conductive molded article of the present invention produced by molding the particle-containing resin composition of the present invention containing a resin and ion conductive organic-inorganic composite particles, due to such a path, the ion conductive organic-inorganic composite particles can enhance the ion conductivity of the ion conductive molded article.

Also, the ion conductive organic-inorganic composite particles of the present invention have excellent dimensional stability (dimensional retentivity), and therefore a structural body made of the ion conductive organic-inorganic composite particles, as well as the ion conductive molded article of the present invention produced by molding the particle-containing resin composition of the present invention in which the ion conductive organic-inorganic composite particles are contained in a resin have excellent dimensional stability.

BRIEF DESCRIPTION OF THE DRAWINGS

FIG. 4 shows a cross sectional view of a sample used for measuring proton conductivity (AC impedance method) in examples.

EMBODIMENT OF THE INVENTION

Figure 1:
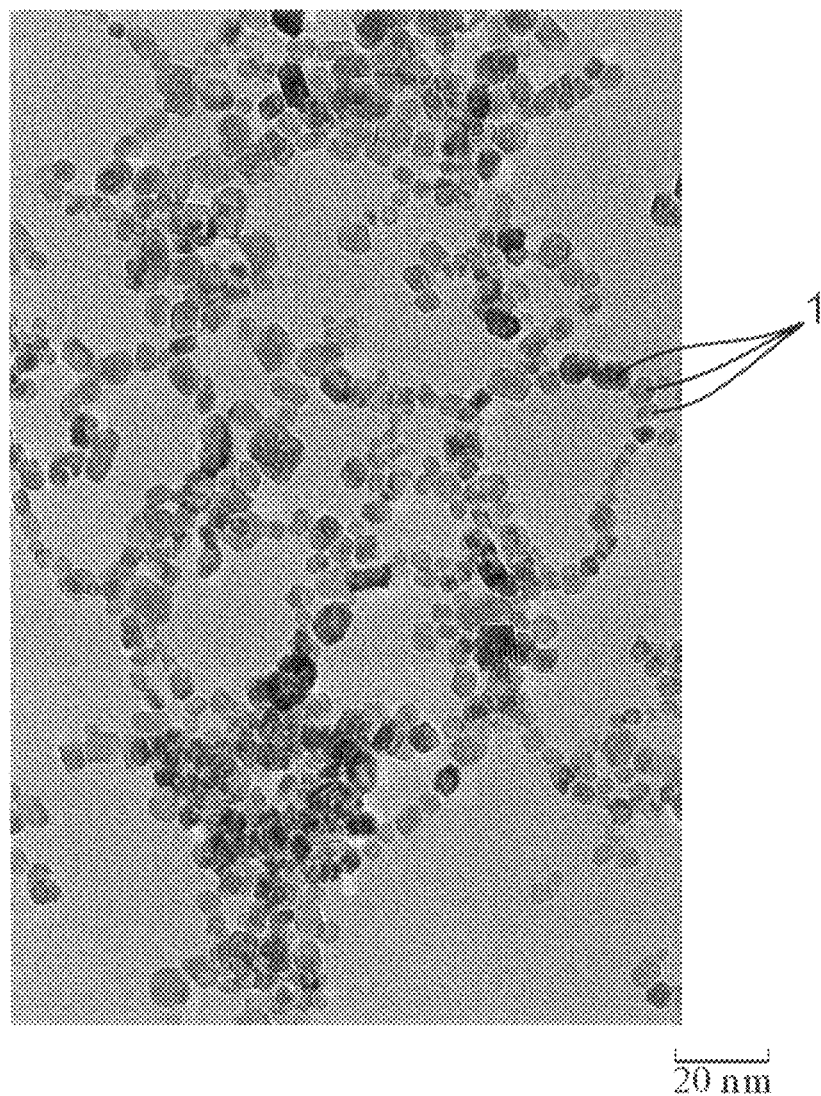
FIG. 1 shows an image-processed TEM micrograph (1,000,000 magnification) of ion conductive organic-inorganic composite particles obtained in Example 17.

Ion conductive organic-inorganic composite particles according to the present invention have an organic group on the surface of inorganic particles.

Specifically, the ion conductive organic-inorganic composite particles are obtained by surface-treating inorganic particles with an organic compound.

The inorganic substance for forming inorganic particles can be, for example, a metal composed of a metal element such as a main group element or a transition element, a nonmetal composed of a nonmetal element such as boron or silicon, an inorganic compound containing a metal element and/or a nonmetal, or the like.

Examples of the metal element and the nonmetal element include elements that are located on the left side and the lower side of a border line that is assumed to pass through boron (B) of the IIIB group, silicon (Si) of the IVB group, arsenic (As) of the VB group, tellurium (Te) of the VIB group and astatine (At) of the VIIB group on the long-form periodic table (IUPAC, 1989). Specific examples thereof include the group IA elements (alkali metals) such as Li, Na, K, Rb and Cs; the IIA group elements (alkaline earth metals) such as Be, Mg, Ca, Sr, Ba and Ra; the group IIIA elements such as Sc and Y; the group IVA elements such as Ti, Zr and Hf; the group VA elements such as V, Nb and Ta; the group VIA elements such as Cr, Mo and W; the group VIIA elements such as Mn and Re; the group VIIIA elements such as Fe, Co, Ni, Ru, Rh, Pd, Os, Ir and Pt; the group IB elements such as Cu, Ag and Au; the group IIB elements such as Zn, Cd and Hg; the group IIIB elements such as B, Al, Ga, In and Tl; the group IVB elements such as Si, Ge, Sn and Pb; the group VB elements such as As, Sb and Bi; the group VIB elements such as Te and Po; the lanthanide series elements such as La, Ce, Pr and Nd; the actinium series elements such as Ac, Th and U, and the like.

The inorganic compound can be, for example, a hydride, a hydroxide, a nitride, a halide, an oxide, a carbonate, a sulfate, a nitrate, a metal complex, an organic metal compound, a sulfide, a carbide, a phosphide, or the like. The inorganic compound can be a composite compound such as, for example, an oxynitride or a composite oxide.

Among the inorganic substances, an inorganic compound is preferable, and more preferable examples include an oxide and a sulfate.

In the oxide, the element that combines with oxygen can be any of the metals listed above, specifically, the group IVA elements and the lanthanide series elements. The element that combines with oxygen is preferably Ti or Ce.

Specific examples of the oxide include titanium oxide (titanium dioxide, titanium oxide (IV), titania: $TiO_2$), cerium oxide (cerium dioxide, cerium oxide (IV), ceria: $CeO_2$) and the like.

These oxides can be used singly or in a combination of two or more.

The sulfate is a compound consisting of a sulfate ion ($SO_4^{2-}$) and a metal cation (more specifically, a compound formed by substitution of the hydrogen atoms of sulfuric acid ($H_2SO_4$) with a metal), and the metal contained in the sulfate can be, for example, an alkali metal, an alkaline earth metal or the like. The alkali metal and the alkaline earth metal can be the same alkali metals and alkaline earth metals as those listed above.

The metal is preferably an alkaline earth metal.

Specifically, the sulfate is preferably a sulfate containing an alkaline earth metal, and examples of such a sulfate include beryllium sulfate, magnesium sulfate, calcium sulfate, strontium sulfate, barium sulfate, radium sulfate and the like. Barium sulfate is preferable.

These sulfates can be used singly or in a combination of two or more.

The inorganic substances listed above can be used singly or in a combination of two or more.

The organic compound is, for example, an organic group-introducing compound for introducing (disposing) an organic group on the surface of inorganic particles. Specifically, the organic compound contains a binding group capable of binding to the surface of inorganic particles and an organic group.

The binding group is selected as appropriate according to the type of inorganic particles and examples thereof include functional groups (binding functional groups) such as carboxyl group, phosphoric acid group (—PO(OH)$_2$, phosphono group), amino group, sulfo group (—SO$_3$H, sulfonic acid group), hydroxyl group, thiol group, epoxy group, isocyanate group (cyano group), nitro group, azo group, silyloxy group, imino group, aldehyde group (acyl group), nitrile group and vinyl group (polymerizable group). Preferable examples include carboxyl group, phosphoric acid group and amino group.

The carboxyl group includes, for example, alkyl ester groups such as ethyl ester, acid anhydride groups and the like.

The phosphoric acid group includes, for example, phosphonyl ester groups including di- or mono-alkoxyphosphonyl ester groups such as diethoxyphosphonyl ester.

One or more of these binding groups are contained in the organic compound. In the case where a plurality of binding groups are contained in the organic compound, a combination of a carboxyl group and an amino group is preferable.

The binding group is bound to a terminal or a side chain of the organic group.

The organic group contains an ion conductive group, specifically, an ion conductive group and a hydrocarbon group.

The ion conductive group can be, for example, a cation conductive group that can conduct cation such as proton ($H^+$), ammonium ion ($NH^{4+}$), lithium ion ($Li^+$) and sodium ion ($Na^+$); an anion conductive group that can conduct anion such as hydroxide ion ($OH^-$) and carbonate ion ($CO_3^{2-}$); or the like.

The cation conductive group can produce anion by electrolytic dissociation. Specific examples thereof include sulfo group, carboxyl group, phosphono group, and the like.

The cation conductive group is preferably a sulfo group or a carboxyl group from the viewpoint of enhancement of cation conductivity. From the viewpoint of further enhancement of cation conductivity, a sulfo group is more preferable.

The anion conductive group can produce cations by electrolytic dissociation. Specific examples include amino group and the like.

These ion conductive groups can be used singly or in a combination of a plurality of different types of ion conductive groups.

The ion conductive group is bound to a terminal (preferably, the other terminal, or in other words, the terminal opposite the terminal that is bound to the binding group) or a side chain of the organic group.

A binding group and an ion conductive group are bound to the hydrocarbon group. Examples of such a hydrocarbon group include divalent hydrocarbon groups such as aliphatic group, alicyclic group, araliphatic group and aromatic group.

The aliphatic group can be, for example, a saturated aliphatic group, an unsaturated aliphatic group, or the like.

Examples of the saturated aliphatic group include alkylene groups having 1 to 30 carbon atoms.

Examples of the alkylene group include linear or branched alkylene groups (paraffin-based hydrocarbon groups) having 1 to 30 carbon atoms such as methylene, ethylene, propylene, isopropylene, butylene, isobutylene, s-butylene, t-butylene, pentylene, isopentylene, neopentylene, hexylene, heptylene, octylene, isooctylene, nonylene, isononylene, decylene, isodecylene, undecylene, dodecylene, tridecylene, tetradecylene, pentadecylene, hexadecylene, heptadecylene, octadecylene, nonadecylene, icosylene and triacontylene. Linear alkyl groups having 4 to 30 carbon atoms are preferable.

Examples of the unsaturated aliphatic group include double bond-containing aliphatic groups having a double bond such as alkenylene groups having 2 to 20 carbon atoms, dienylene groups having 4 to 20 carbon atoms and trienylene groups having 6 to 20 carbon atoms; triple bond-containing aliphatic groups having a triple bond such as alkynylene groups having 2 to 20 carbon atoms, and the like.

Examples of the alkenylene group include alkenyl groups (olefin-based hydrocarbon groups) having 2 to 20 carbon atoms such as ethenylene (vinylene), propenylene, butenylene, pentenylene, hexenylene, octenylene, nonenylene, decenylene, undecenylene, dodecenylene, tetradecenylene, hexadecenylene, octadecenylene and icocenylene, and the like.

Examples of the dienylene group include dienylene groups having 4 to 20 carbon atoms and a conjugated double bond such as 1,3-butadienylene, and the like.

Examples of the trienylene group include trienylene groups having 6 to 20 carbon atoms and a conjugated double bond such as 1,3,5-hexatrienyl, and the like.

Examples of the alkynylene group include alkynylene groups (acetylene-based hydrocarbon groups) having 2 to 20 carbon atoms such as propynylene, butynylene, pentynylene, hexnylene, heptynylene, octynylene, decynylene, undecynylene, dodecynylene, tridecynylene, tetradecynylene, pentadecynylene, hexadecynylene, heptadecynylene and octadecynylene.

The unsaturated aliphatic group is preferably a double bond-containing aliphatic group.

Examples of the alicyclic group include cycloalkylene groups having 3 to 20 carbon atoms such as cyclopropylene, cyclobutylene, cyclopentylene, cyclohexylene, cycloheptylene and cyclooctylene, and the like.

Examples of the araliphatic group include aralkylen groups having 7 to 20 carbon atoms such as phenyl ethylene, phenyl propylene, phenyl butylene, phenyl pentylene, phenyl hexylene, phenyl octylene, phenyl decylene, phenyl heptylene, diphenyl methylene, diphenyl propylene and biphenyl ethylene, and the like.

Examples of the aromatic group include arylene groups having 6 to 20 carbon atoms such as phenylene, xylylene and naphthylene.

Preferable hydrocarbon groups are aliphatic group, araliphatic group and aromatic group.

An ion conductive group is bound to the hydrocarbon group, and the organic group containing the ion conductive group and the hydrocarbon group is regarded as an ion conductive group-containing hydrocarbon group.

The ion conductive group-containing hydrocarbon group specifically is a monovalent ion conductive group-containing hydrocarbon group such as a sulfo group-containing hydrocarbon group, a carboxyl group-containing hydrocarbon group, a phosphono group-containing hydrocarbon group or an amino group-containing hydrocarbon group.

Examples of the sulfo group-containing hydrocarbon group include sulfo group-containing hydrocarbon groups containing one sulfo group including sulphosaturated aliphatic groups (sulphoaliphatic groups) such as 2-sulfoethyl, 3-sulfopropyl, 4-sulfobutyl, 5-sulfopentyl, 6-sulphohexyl, 7-sulfoheptyl, 8-sulfooctyl, 9-sulfononyl and 10-sulfodecyl; sulphoaraliphatic groups such as sulfophenylpropyl, sulfophenylbutyl, sulfophenylpentyl, sulfophenylhexyl, sulfophenyloctyl and sulfophenyldecyl; and sulfoaromatic groups such as sulfophenyl, sulfoxylyl and sulfonaphthyl. Other examples include disulfo group-containing hydrocarbon groups containing two sulfo groups including disulphosaturated aliphatic groups (monosulphoaliphatic groups) such as 5,7-disulfoheptyl.

Examples of the carboxyl group-containing hydrocarbon group include carboxysaturated aliphatic groups such as 3-carboxypropyl, 4-carboxybutyl, 5-carboxy pentyl, 6-carboxyhexyl, 8-carboxyoctyl and 10-carboxydecyl; carboxyaliphatic groups including carboxyunsaturated aliphatic groups such as 3-carboxy-2-methylpropenyl; carboxy araliphatic groups such as carboxy phenyl hexyl; carboxy aromatic groups such as carboxy phenyl, and the like. Other examples of the carboxyl group-containing hydrocarbon group include carboxylic acid alkyl ester groups such as a propionic acid ethyl ester group, and the like.

Examples of the phosphono group-containing hydrocarbon group include phosphono group-containing aliphatic groups including phosphonosaturated aliphatic groups such as 3-phosphonopropyl, 4-phosphonobuyl, 5-phosphonopentyl, 6-phosphonohexyl, 8-phosphonooctyl; phosphono group-containing araliphatic groups such as phosphono phenyl hexyl; phosphono group-containing aromatic groups such as phosphono phenyl, and the like.

Examples of the amino group-containing hydrocarbon group include aminoaliphatic groups including aminosaturated aliphatic groups such as 3-aminopropyl, 4-aminobutyl, 5-aminopentyl, 6-aminohexyl and 8-aminooctyl; aminoaraliphatic groups such as aminophenyl hexyl; aminoaromatic groups such as aminophenyl and pyridinyl, and the like.

Specifically, the ion conductive group-containing hydrocarbon group is preferably a sulfo group-containing hydrocarbon group, a carboxyl group-containing hydrocarbon group or an amino group-containing hydrocarbon group from the viewpoint of enhancement of ion conductivity, and more preferably a sulfo group-containing hydrocarbon group or an amino group-containing hydrocarbon group from the viewpoint of further enhancement of ion conductivity.

The organic compound is an ion conductive group and binding group-containing hydrocarbon (first organic compound) in which a binding group is bound to the hydrocarbon group of the ion conductive group-containing hydrocarbon group.

The organic compound (first organic compound) is specifically a sulfo group-containing organic compound, a carboxyl group-containing organic compound, a phosphono group-containing organic compound, an amino group-containing organic compound or the like.

Examples of the sulfo group-containing organic compound when the ion conductive group is a sulfo group and the binding group is a carboxyl group include monosulfocarboxylic acids including sulfosaturated aliphatic group-containing carboxylic acids (sulfoaliphatic group-containing carboxylic acids) such as 2-sulfoethanoic acid (sulfoacetic acid), 3-sulfopropanoic acid, 4-sulfobutanoic acid, 5-sulfopentanoic acid, 6-sulfohexanoic acid, 7-sulfoheptanoic acid, 8-sulfooctanoic acid, 9-sulfononanoic acid and 10-sulfodecanoic acid; sulfoaraliphatic group-containing carboxylic acids such as sulfophenyl propionic acid, di(sulfophenyl) propionic acid, sulfophenyl butanoic acid, sulfophenyl pentanoic acid, sulfophenyl hexanoic acid, sulfophenyl octanoic acid and sulfophenyl decanoic acid; and sulfoaromatic group-containing carboxylic acids such as sulfobenzoic acid.

Other examples of the sulfo group-containing organic compound include disulfocarboxylic acids such as 5,7-disulfoheptanoic acid.

Examples of the sulfo group-containing organic compound when the binding group is a carboxyl group and an amino group include sulfoamino acids (sulfo-monoaminomonocarboxylic acids) such as 2-amino-3-sulfo-propanoic acid (cysteic acid).

Examples of the carboxyl group-containing organic compound when the ion conductive group is a carboxyl group and the binding group is also a carboxyl group include aliphaticdicarboxylic acids including saturated aliphaticdicarboxylic acids such as propanedioic acid (malonic acid), butanedioic acid (succinic acid), pentanedioic acid (glutaric acid), hexanedioic acid (adipic acid), octanedioic acid (sebacic acid) and decanedioic acid; unsaturated aliphaticdicarboxylic acids such as itaconic acid (2-methylidenesuccinic acid), and the like. Other examples include araliphatic dicarboxylic acids such as 6-carboxy phenylhexanoic acid; aromatic dicarboxylic acids such as phthalic acid, terephthalic acid and isophthalic acid, and the like.

Examples of the carboxyl group-containing organic compound when the binding group is a phosphonyl ester group include phosphoric acid group (phosphonyl ester group)-containing alkyl esters such as 3-(diethoxy-phosphonyl) ethyl propionic acid ester, 8-decylphosphonic acid diethyl ester, 10-octylphosphonic acid diethyl ester, 10-(diethoxy-phosphonyl)decanoic acid ethyl ester, and the like.

Examples of the phosphono group-containing organic compound when the ion conductive group is a phosphono group and the binding group is a carboxyl group include phosphono group-containing aliphatic group-containing carboxylic acids (phosphono aliphatic acids) including phosphonosaturated aliphatic group-containing carboxylic acids (phosphonosaturated aliphatic acids) such as 3-phosphono propanoic acid, 4-phosphono butanoic acid, 5-phosphono pentanoic acid, 6-phosphono hexanoic acid and 8-phosphono octanoic acid; phosphono group-containing araliphatic group carboxylic acids such as phosphono phenyl hexanoic acid; phosphono group-containing aromatic carboxylic acids such as phosphono benzoic acid, and the like.

Examples of the amino group-containing organic compound when the ion conductive group is an amino group and the binding group is a carboxyl group include aminoaliphatic group-containing carboxylic acids including aminosaturated aliphatic group-containing carboxylic acids such as 3-aminopropanoic acid (β-alanine), 4-aminobutanoic acid (γ-amino acid), 6-aminohexanoic acid and 8-aminooctanoic acid; aminoaraliphatic group-containing carboxylic acids such as aminophenyl hexanoic acid; aminoaromatic group-containing carboxylic acids such as aminobenzoic acid, and the like.

These organic compounds can be used singly or in a combination of two or more.

Specifically, the organic compound is preferably a sulfo group-containing organic compound, a carboxyl group-containing organic compound, or an amino group-containing organic compound from the viewpoint of enhancement of ion conductivity. From the viewpoint of further enhancement of ion conductivity, a sulfo group-containing organic compound and an amino group-containing organic compound are more preferable.

The organic compound (first organic compound, ion conductive group and binding group-containing hydrocarbon) can also be used together with an organic compound that does not contain an ion conductive group (second organic compound, ion conductive group-free and binding group-containing hydrocarbon).

The second organic compound is an organic compound formed by substitution of the ion conductive group of the first organic compound with hydrogen, and specifically is a carboxylic acid having a monovalent hydrocarbon group such as a monovalent (saturated) aliphatic group such as hexyl or decyl. Specific examples are hexanoic acid, decanoic acid and the like.

The ion conductive organic-inorganic composite particles can be obtained by subjecting an inorganic substance and an organic compound to a reaction treatment, preferably a high temperature treatment.

The high temperature treatment is carried out in a solvent. As the solvent, for example, water or any of the organic compounds listed above can be used.

Specifically, the ion conductive organic-inorganic composite particles are obtained by subjecting an inorganic substance and an organic compound to a high temperature treatment (hydrothermal synthesis, hydrothermal reaction) in water under high pressure conditions, or by subjecting an inorganic substance to a high temperature treatment in an organic compound (high temperature treatment in an organic compound). In other words, the ion conductive organic-inorganic composite particles can be obtained by surface-treating the surface of inorganic particles formed by an inorganic substance with an organic compound.

In the hydrothermal synthesis, for example, the inorganic substance and the organic compound are reacted under high-temperature and high-pressure conditions in the presence of water (first hydrothermal synthesis).

The inorganic substance subjected to the first hydrothermal synthesis is preferably a sulfate.

The proportions of respective components per 100 parts by mass of the inorganic substance are as follows: the total amount of the organic compound is, for example, 1 to 1500 parts by mass, preferably 5 to 500 parts by mass and more preferably 5 to 250 parts by mass; and the proportion of water is, for example, 50 to 8000 parts by mass, preferably 80 to 6600 parts by mass and more preferably 5 to 4500 parts by mass.

The density of the organic compound is usually 0.8 to 1.1 g/mL, and thus the proportion of the total amount of the organic compound per 100 g of the inorganic substance is, for example, 0.9 to 1880 mL, preferably 4.5 to 630 mL and more preferably 4.5 to 320 mL.

Also, the total number of moles of the organic compound per mol of the inorganic substance is, for example, 0.01 to 1000 mol, preferably 0.02 to 50 mol and more preferably 0.1 to 10 mol.

Also, the density of water is usually approximately 1 g/mL, and thus the proportion of water per 100 g of the inorganic substance is, for example, 50 to 8000 mL, preferably 80 to 6600 mL and more preferably 500 to 4500 mL.

Specific reaction conditions for the hydrothermal reaction are as follows. The heating temperature is, for example, 100 to 500° C. and preferably 200 to 400° C. The pressure is, for example, 0.2 to 50 MPa, preferably 1 to 50 MPa and more preferably 10 to 50 MPa. The reaction time is, for example, 1 to 200 minutes and preferably 3 to 150 minutes. In the case where a continuous reactor is used, the reaction time is, for example, one minute or less.

The reaction product obtained by the above reaction includes a precipitate that mostly precipitates in water and a deposit that adheres to the inner wall of the container.

The precipitate is obtained by, for example, sedimentation separation in which the reaction product is settled by gravity or a centrifugal field. Preferably, the precipitate is obtained as a precipitate of the reaction product by centrifugal sedimentation (centrifugal separation) in which the reaction product is settled by a centrifugal field.

Also, the deposit is recovered by, for example, a scraper (spatula) or the like.

The reaction product can also be recovered (separated) by adding a solvent to wash away an unreacted organic compound (or in other words, dissolving the organic compound in the solvent) and thereafter removing the solvent.

The solvent can be an organic solvent. Specific examples of the organic solvent include alcohols (hydroxyl group-containing aliphatic hydrocarbons) such as methanol, ethanol, propanol and isopropanol; ketones (carbonyl group-containing aliphatic hydrocarbons) such as acetone, methyl ethyl ketone, cyclohexanone and cyclopentanone; aliphatic hydrocarbons such as pentane, hexane and heptane; halogenated aliphatic hydrocarbons such as dichloromethane, chloroform and trichloroethane; halogenated aromatic hydrocarbons such as chlorobenzene and dichlorobenzene (specifically, orthodichlorobenzene); ethers such as tetrahydrofuran; aromatic hydrocarbons such as benzene, toluene and xylene; nitrogen-containing compounds such as N-methylpyrrolidone (NMP), pyridine, acetonitrile and dimethylformamide; aprotic solvents such as dimethyl sulfoxide (DMSO) and dimethylformamide, and the like.

Also, the solvent can be an aqueous solvent, for example, an aqueous pH adjusting solution such as aqueous ammonia.

Among the solvents listed above, an alcohol is preferable.

The washed reaction product is separated from the solvent (supernatant liquid) by, for example, filtration, decantation or the like, and recovered. After that, the reaction product is dried by, for example, application of heat, an air stream or the like if necessary.

In this manner, the organic-inorganic composite particles having an organic group (ion conductive group-containing hydrocarbon group) on the surface of inorganic particles can be obtained.

In the first hydrothermal synthesis, the inorganic substance before reaction and the inorganic substance after reaction that forms inorganic particles are the same.

Alternatively, ion conductive organic-inorganic composite particles containing inorganic particles formed of an inorganic substance that is different from the inorganic substance serving as a starting material can be obtained by subjecting an inorganic substance (starting material) and an organic compound to a hydrothermal synthesis (second hydrothermal synthesis).

The inorganic substance subjected to the second hydrothermal synthesis can be, for example, a hydroxide, a metal complex, an organic metal compound or the like, and preferably is a hydroxide or a metal complex.

In the hydroxide, the element (element that constitutes a cation that combines with a hydroxyl ion ($OH^-$)) contained in the hydroxide can be the same as the element that combines with oxygen in an oxide listed above.

Specifically, the hydroxide can be, for example, cerium hydroxide ($Ce(OH)_4$).

In the metal complex, the element (element that constitutes a cation that coordinates with its ligand) contained in the metal complex can be, for example, titanium, iron, tin, zirconium or the like. Titanium is preferable.

The ligand of the metal complex can be, for example, a hydroxycarboxylic acid such as 2-hydroxyoctanoic acid or lactic acid; a hydroxycarboxylic acid salt such as ammonium lactate; or the like.

The metal complex can be, for example, 2-hydroxyoctanoic acid titanate, titanium lactate, titanium bis(ammonium lactate)dihydroxyide or the like. The metal complex can be obtained by a known method using an element and a ligand listed above.

As the organic compound, for example, the same organic compounds as those that can be used in the first hydrothermal synthesis described above can be used.

Then, in the second hydrothermal synthesis, the inorganic substance and the organic compound are reacted under high-temperature and high-pressure conditions in the presence of water.

The proportions of respective components per 100 parts by mass of the inorganic substance are as follows: the proportion of the organic compound is, for example, 1 to 1500 parts by mass, preferably 5 to 500 parts by mass and more preferably 5 to 250 parts by mass; and the proportion of water is, for example, 50 to 8000 parts by mass, preferably 80 to 6600 parts by mass and more preferably 80 to 4500 parts by mass.

The proportion of the organic compound per 100 g of the inorganic substance 100 g is, for example, 0.9 to 1880 mL, preferably 4.5 to 630 mL and more preferably 4.5 to 320 mL. The number of moles of the organic compound per mol of the inorganic substance is, for example, 0.01 to 10000 mol and preferably 0.1 to 10 mol.

Also, the proportion of water per 100 g of the inorganic substance is, for example, 50 to 8000 mL, preferably 80 to 6600 mL and more preferably 5 to 4500 mL.

The reaction conditions for the second hydrothermal synthesis are the same as those for the first hydrothermal synthesis described above.

In this manner, the ion conductive organic-inorganic composite particles containing an organic group (ion conductive group-containing hydrocarbon group) on the surface of inorganic particles formed of an inorganic substance that is different from the inorganic material serving as a starting material are obtained.

In the formulation used in the second hydrothermal synthesis, a carbonic acid source or a hydrogen source can be blended with the components described above.

The carbonic acid source can be, for example, carbon dioxide (carbonic acid gas), formic acid and/or urea.

The hydrogen source can be, for example, hydrogen (hydrogen gas), an acid such as formic acid or lactic acid, a hydrocarbon such as methane or ethane, or the like.

The proportion of the carbonic acid source or the hydrogen source is, for example, 5 to 140 parts by mass and preferably 10 to 70 parts by mass per 100 parts by mass of the inorganic substance.

The proportion of the carbonic acid source can be, for example, 5 to 100 mL and preferably 10 to 50 mL per 100 g of the inorganic substance. The number of moles proportion of the carbonic acid source may be, for example, 0.4 to 100 mol, preferably 1.01 to 10.0 mol and more preferably 1.05 to 1.30 mol per mol of the inorganic substance.

The proportion of the hydrogen source can be, for example, 5 to 100 mL and preferably 10 to 50 mL per 100 g of the inorganic substance. The number of moles proportion of the hydrogen source may be, for example, 0.4 to 100 mol, preferably 1.01 to 10.0 mol and more preferably 1.05 to 2.0 mol per mol of the inorganic substance.

In the high temperature treatment in an organic compound, an inorganic substance and an organic compound are blended and heated under, for example, normal atmospheric pressure conditions. The organic compound is subjected to the high-temperature treatment while serving as an organic group-introducing compound as well as a solvent for dispersing or dissolving the inorganic substance.

The proportion of the total amount of the organic compound per 100 parts by mass of the inorganic substance is, for example, 10 to 10000 parts by mass and preferably 100 to 1000 parts by mass. The proportion of the total amount of the organic compound in terms of volume is, for example, 10 to 10000 mL and preferably 100 to 1000 mL per 100 g of the inorganic substance.

The heating temperature is, for example, a temperature above 100° C., preferably 125° C. or higher, and more preferably 150° C. or higher, usually for example, 300° C. or lower and preferably 275° C. or lower. The heating time is, for example, 1 to 60 minutes and preferably 3 to 30 minutes.

Among the synthesis methods described above (the first and second hydrothermal syntheses, and the high temperature treatment in an organic compound), the first and second hydrothermal syntheses are preferable.

In the case where the organic compound contains a first organic compound and a second organic compound, they are simultaneously blended with an inorganic substance in each high temperature treatment. Alternatively, it is possible to sequentially blend a first organic compound and a second organic compound with an inorganic substance, and perform a reaction treatment each time the compound is blended. Conversely, it is also possible to sequentially blend a second organic compound and a first organic compound and perform a reaction treatment.

Sequentially blending a second organic compound and a first organic compound and performing a reaction treatment each time the compound is blended is preferable.

Specifically, first, organic-inorganic composite particles containing an ion conductive group-free hydrocarbon group on the surface thereof are obtained by blending an inorganic substance and a second organic compound and performing a reaction treatment under the same conditions as described above. After that, the organic-inorganic composite particles are blended with a first organic compound, and a reaction treatment is again performed under the same conditions as described above to give ion conductive organic-inorganic composite particles. The obtained ion conductive organic-inorganic composite particles contain, on the surface of inorganic particles, an ion conductive group-free and binding group-containing hydrocarbon and an ion conductive group-containing hydrocarbon group.

Alternatively, the ion conductive organic-inorganic composite particles can also be produced by obtaining precursor particles and reacting the precursor particles.

The precursor particles contain a precursor group that produces an ion conductive group. Specifically, the precursor particles contain an organic group containing such a precursor group on the surface of inorganic particles. The precursor particles are obtained by subjecting an inorganic substance and a precursor group-containing hydrocarbon to a reaction treatment under the same conditions as described above. The precursor group-containing hydrocarbon contains a precursor group.

Examples of the precursor group when the ion conductive group is a sulfo group include sulfur-containing groups that produce a sulfo group by an oxidation reaction such as thiol group (—SH), sulfide group (—S-group) and disulfide group (—S—S-group); and aromatic ring groups to which a sulfo group is added (substituted with a hydrogen atom) by a sulfonation reaction such as monovalent araliphatic groups (specifically, phenylhexyl, diphenylpropyl) and monovalent aromatic groups (specifically, phenyl).

Examples of the precursor group-containing hydrocarbon include thiol group-containing carboxylic acids such as 10-thio-decanoic acid (10-carboxy-1-decanethiol), 11-thio-undecanoic acid (11-carboxy-1-uhendecanethiol) and β-lipoic acid; —S—S-group-containing carboxylic acids such as α-lipoic acid; araliphatic group-containing carboxylic acids such as 6-phenylhexanoic acid and 3,3-diphenyl propionic acid; and aromatic group-containing carboxylic acids such as benzoic acid.

The conditions for the reaction treatment for preparing precursor particles are the same as those for the reaction treatment for preparing ion conductive organic-inorganic composite particles. The precursor group-containing hydrocarbon contains a binding group, a precursor and a divalent hydrocarbon group that is bound thereto. Examples of the binding group and the hydrocarbon group include the same binding groups and hydrocarbon groups as those listed above.

After that, the obtained precursor particles are subjected to a reaction, specifically, an oxidation reaction or a sulfonation reaction to produce an ion conductive group from the precursor group, whereby ion conductive organic-inorganic composite particles are obtained.

The oxidation reaction is carried out by blending the precursor particles with an oxidizing agent and subjecting the resulting mixture to a high temperature treatment.

The oxidizing agent can be, for example, a peroxide such as hydrogen peroxide, peroxycarboxylic acid (specifically, percarboxylic acid such as peracetic acid), or the like.

The sulfonation reaction is carried out by blending the precursor particles with a sulfonating agent and subjecting the resulting mixture to a high temperature treatment.

Examples of the sulfonating agent include sulfuric acid; halogenated sulfonic acids (halogenated sulfuric acids) such as chlorosulfonic acid (chlorosulfuric acid); sodium alkyl sulfates such as 1,3,5-trimethylbenzene sulfonic acid and sodium decyl sulfate, and other sulfuric acids.

The conditions for the high temperature treatment are the same as those described above.

In the sulfonation reaction, for example, a known catalyst can be added to the system in an appropriate proportion.

The oxidation reaction and the sulfonation reaction can also be carried out by blending a solvent listed above.

In order to increase the production rate (conversion rate) of the ion conductive group from the precursor group, the oxidation reaction and the sulfonation reaction each can be repeatedly carried out. Specifically, the oxidation reaction and/or the sulfonation reaction are carried out a plurality of times according to the conversion rate. More specifically, the oxidation reaction and the sulfonation reaction are each carried out, for example, 1 to 10 times, preferably 1 to 5 times and more preferably 1 to 3 times.

The proportion of the oxidizing agent or the sulfonating agent per 100 parts by mass of the precursor particles is, for example, 0.1 to 1000 parts by mass, preferably 1 to 500 parts by mass and more preferably 10 to 500 parts by mass.

In the foregoing description, precursor particles are prepared from an inorganic substance and then ion conductive organic-inorganic composite particles are prepared using the precursor particles, but the ion conductive organic-inorganic composite particles can also be prepared, for example, in a single step, using an inorganic substance and a precursor group-containing hydrocarbon.

Specifically, an inorganic substance, a precursor group-containing hydrocarbon and an oxidizing agent or a sulfonating agent are subjected to a high temperature treatment in water under high pressure conditions (hydrothermal synthesis, hydrothermal reaction).

The proportion of the oxidizing agent or the sulfonating agent and the conditions for the high temperature treatment are the same as those described above.

There is no particular limitation on the configuration of the ion conductive organic-inorganic composite particles (primary particles) obtained in the above-described manner, and for example the ion conductive organic-inorganic composite particles may be anisotropic or isotropic, with an average particle size (average maximum length in the case where they are anisotropic) of, for example, 200 μm or less, preferably 1 nm to 200 μm, more preferably 1 nm to 50 μm, and even more preferably 3 nm to 10 μm.

As will be described in detail in the examples given below, the average particle size of the ion conductive organic-inorganic composite particles is calculated by a transmission electron microscopic (TEM) and/or scanning electron microscopic (SEM) image analysis.

The ion conductive organic-inorganic composite particles obtained in the above-described manner can be subjected to wet classification.

Specifically, a solvent is added to the ion conductive organic-inorganic composite particles, and the resulting mixture is stirred and allowed to stand still, and thereafter separated into a supernatant and a precipitate. As the solvent, the same solvents as those listed above can be used. Preferably, the solvent is an aliphatic hydrocarbon.

After that, the supernatant is recovered to give ion conductive organic-inorganic composite particles having a small particle size.

With the wet classification, the average particle size of the resulting ion conductive organic-inorganic composite particles (primary particles) can be adjusted to, for example, 1 nm to 450 nm, preferably 1 nm to 200 nm and more preferably 1 nm to 100 nm.

The ion conductive organic-inorganic composite particles obtained in the above-described manner contain an organic group on the surface of inorganic particles, and the organic group contains an ion conductive group.

The inorganic substance of the inorganic particles is identified by, for example, X-ray diffractometry (XRD) or the like. The organic group is identified by, for example, Fourier transform infrared spectrophotometry (FT-IR) or the like, and the ion conductive group is identified by, for example, X-ray photoelectron spectroscopy (ESCA) or the like.

With the ion conductive organic-inorganic composite particles, the inorganic particles are unlikely to coagulate in a dry state, and even if the inorganic particles appear coagulated in a dry state, the contact of inorganic particles (or in other words, formation of secondary particles) is prevented in microscopic view. That is, coagulation (formation of secondary particles) is prevented and the ion conductive organic-inorganic composite particles are dispersed as primary particles substantially uniformly in the resin.

In other words, the ion conductive organic-inorganic composite particles have at least a configuration that does not allow the inorganic particles to contact with each other by steric hindrance of the organic group that is present on the surface of the inorganic particles. Specifically, the ion conductive organic-inorganic composite particles have at least a structure that allows the inorganic particles to self-assemble and has a gap between assemblies (between inorganic particles).

Furthermore, in the ion conductive organic-inorganic composite particles, the organic group exerts ion conductivity, and therefore not only the ion conductive organic-inorganic composite particles, but also a particle-containing resin composition (described later) and an ion conductive molded article (described later) that contain the ion conductive organic-inorganic composite particles have ion conductivity.

In the ion conductive organic-inorganic composite particles, the proportion of the amount of the organic group relative to the surface area of the inorganic particles, or in other words, the surface coverage by the organic group in the ion conductive organic-inorganic composite particles (=(the number of organic groups/the number of binding groups on the surface of inorganic particles)×100) is, for example, 1% or greater, preferably 10% or greater and usually 100% or less.

To calculate the surface coverage, first, the configuration of the ion conductive organic-inorganic composite particles is checked with a transmission electron microscope (TEM) and at the same time the surface area of an exposed surface (the surface of inorganic particles that is not bound to the binding group) is assumed (estimated?). Then, the average particle size is calculated, and the number of atoms exposed at the particle surface in the ion conductive organic-inorganic composite particles (the number of atoms capable of binding to the binding group) is calculated from the configuration of the inorganic particles, the average particle size and the surface area of the exposed surface.

Also, the proportion of the organic group in the ion conductive organic-inorganic composite particles is calculated from the weight change as a result of the ion conductive organic-inorganic composite particles being heated to 600° C. by simultaneous thermogravimetry and differential thermal measurement (TG-DTA). After that, the amount of atoms exposed at the particle surface (the amount of the organic group per atom capable of binding to the binding group) is calculated from the molecular weight of the organic group, the particle density and the average volume. Then, the surface coverage is determined from the calculated results. In the case where two or more types of ion conductive groups are contained, the surface coverage is calculated by eliminating the binding group if necessary and quantifying the organic group by ESCA, TG-DTA or GC-MS analysis, which will be described in detail in the examples given below.

The existing proportion of the ion conductive group is, for example, 0.01 mmol/g or greater, preferably 0.05 mmol/g or greater, and usually 10 mmol/g or less.

The existing proportion of the ion conductive group can be calculated from the surface coverage described above. The existing proportion of the ion conductive group can also be calculated from the results of IEC (ion exchange capacity) analysis, which will be described in detail in the examples given below.

If the existing proportion of the ion conductive group is within the above range, the desired ion conductivity can be obtained.

Then, a particle-containing resin composition can be prepared by blending the ion conductive organic-inorganic composite particles with a resin. Specifically, the ion conductive organic-inorganic composite particles is mixed with (dispersed in) a resin.

The resin for dispersing the ion conductive organic-inorganic composite particles is not particularly limited, and can be, for example, a thermosetting resin, a thermoplastic resin or the like.

Examples of the thermosetting resin include polycarbonate resin, epoxy resin, thermosetting polyimide resin, phenol resin, phenoxy resin, urea resin, melamine resin, diallyl phthalate resin, silicone resin, thermosetting urethane resin, and the like.

Examples of the thermoplastic resin include thermoplastic fluorocarbon resins (specifically, polyvinylidene fluoride resin (PVdF), ethylene-tetrafluoroethylene copolymer (ETFE), tetrafluoroethylene-perfluoro-alkoxy-ethylene copolymer (PFA), tetrafluoroethylene-hexafluoropropylene copolymer (FEP) and the like), olefin resin, acrylic resin, polystyrene resin, polyester resin, polyacrylonitrile resin, maleimide resin, polyvinyl acetate resin, ethylene-vinylacetate copolymer, polyvinyl alcohol resin, polyamide resin, polyvinyl chloride resin, polyacetal resin, polyphenylene oxide resin, polyphenylene sulfide resin, polyether ether ketone resin (PEEK), polyallylsulfone resin, thermoplastic polyimide resin, thermoplastic urethane resin, polyetherimide resin, polymethylpentene resin, cellulose resin, liquid crystal polymer, and the like.

Other examples of the thermoplastic resin include conductive resins such as ionomer, polyaniline and polyacetylene; synthetic rubbers such as styrene-butadiene rubber and fluorocarbon rubber, and the like.

Other examples of the thermoplastic resin include modified products and mixtures of the resins listed above, and copolymers containing a monomer of the resins listed above.

The thermoplastic resin has a weight average molecular weight of, for example, 10000 to 1000000 and preferably 100000 to 1000000.

The resin may be an ion conductive resin having ion conductivity. Specific examples of the ion conductive resin include sulfonated thermoplastic resins such as graft copolymer of sulfonic acid group-containing polymer and PVdF (sulfonic acid group-containing PVdF), polysulfone resin, polyether sulfone resin, sulfonated polyether sulfone resin and sulfonated PEEK, and the like.

These resins can be used singly or in a combination of two or more.

A thermoplastic resin is preferable.

The resin (specifically, thermoplastic resin) has a melting temperature of, for example, 200 to 300° C. and a softening temperature of, for example, 150 to 280° C.

In order to disperse the ion conductive organic-inorganic composite particles in the resin, for example, at least the ion conductive organic-inorganic composite particles and the resin are blended and then mixed.

In order to mix the ion conductive organic-inorganic composite particles and the resin, they are blended and the resulting mixture is, for example, stirred or shaken. Alternatively, the ion conductive organic-inorganic composite particles and the resin can be mixed by, for example, a known stirring method that applies a shear force to the ion conductive organic-inorganic composite particles and the resin, such as a ball mill, a roll mill, any other mill, a kneader, or a mortar. After the above components have been mixed, air bubbles in the particle-containing resin composition can be removed with a stirring/defoaming machine such as a hybrid mixer, if necessary.

The proportion of the ion conductive organic-inorganic composite particles per 100 parts by mass of the resin is, for example, 0.1 to 9,900 parts by mass, preferably 1 to 9,000 parts by mass and more preferably 5 to 900 parts by mass. In other words, the proportion of the ion conductive organic-inorganic composite particles is adjusted such that the concentration of the ion conductive organic-inorganic composite particles in the ion conductive molded article is, for example, 0.1 to 99 mass %, preferably 1 to 90 mass % and more preferably 1 to 80 mass %.

Preferably, the ion conductive organic-inorganic composite particles, the solvent and the resin are blended and the resulting mixture is stirred to prepare a particle-containing resin composition (varnish). Then, by blending the solvent, the ease of handling of the particle-containing resin composition can be enhanced.

There is no limitation on the solvent, and any of the solvents used in washing described above can be used. Other examples include alicyclic hydrocarbons such as cyclopentane and cyclohexane; esters such as ethyl acetate; polyols such as ethylene glycol and glycerin; acrylic monomers such as isostearyl acrylate, lauryl acrylate, isoboronyl acrylate, butyl acrylate, methacrylate, acrylic acid, tetrahydrofurfuryl acrylate, 1,6-hexanediol diacrylate, 2-hydroxyethyl acrylate, 4-hydroxybutyl acrylate, phenoxyethyl acrylate and acryloylmorpholine; vinyl group-containing monomers such as styrene and ethylene; bisphenol A epoxy resin, and the like.

These solvents can be used singly or in a combination of two or more.

The proportion of the solvent per 100 parts by mass of the resin is, for example, 1 to 9900 parts by mass, preferably 40 to 2000 parts by mass and more preferably 50 to 1000 parts by mass.

In the case where, for example, the resin is liquefied (is liquid) at room temperature or the resin melts by application of heat, the resin can be blended with the ion conductive organic-inorganic composite particles without use of a solvent when preparing a particle-containing resin composition.

The particle-containing resin composition prepared in this manner is a melt of the particle-containing resin composition which does not include a solvent.

In the case where the resin is a thermoplastic resin, the heating temperature is greater than or equal to the melting temperature of the resin, specifically, 150 to 350° C. In the case where the resin is a thermosetting resin, the heating temperature is a temperature at which the resin is B staged, for example, 85 to 140° C.

After that, the obtained particle-containing resin composition is applied to, for example, a known support plate to form a coating, and the coating is cooled, cured and dried, whereby an ion conductive molded article as an ion conductive film is molded. Also, a molded article of particle-containing resin composition can be produced by using a known molding machine such as a pressing machine, a kneader or an extruding machine.

The particle-containing resin composition containing a solvent is applied by using, for example, a known application method such as spin coating or bar coating. It is also possible to manually apply the particle-containing resin composition by using a known applicator.

Simultaneously with or immediately after application of the particle-containing resin composition, the solvent is removed by volatilization. If necessary, the solvent can be dried by application of heat after application of the particle-containing resin composition.

The viscosity of the particle-containing resin composition at the time of application can be adjusted as appropriate, for example, by an evaporator or through a process such as condensation by drying.

The thickness of the obtained ion conductive film can be set as appropriate according to the use and purpose, and the thickness is, for example, 0.1 to 2000 μm, preferably 1 to 1000 μm and more preferably 5 to 500 μm.

The ion conductive film can also be molded by a melt molding method in which the particle-containing resin composition is extruded by an extruding machine or the like.

The ion conductive molded article can also be molded as an ion conductive block (mass) by injecting the particle-containing resin composition into a metal mold or the like and thereafter subjecting the resultant to, for example, heat molding such as heat pressing.

The ion conductive organic-inorganic composite particles of the present invention is capable of forming a structure having at least a configuration that does not allow the inorganic particles to contact with each other by steric hindrance of the organic group that is present on the surface of the inorganic particles.

Also, because the organic group has an ion conductive group, a path in which the organic groups are in close proximity and that easily conducts ions can be formed.

Figure 2:
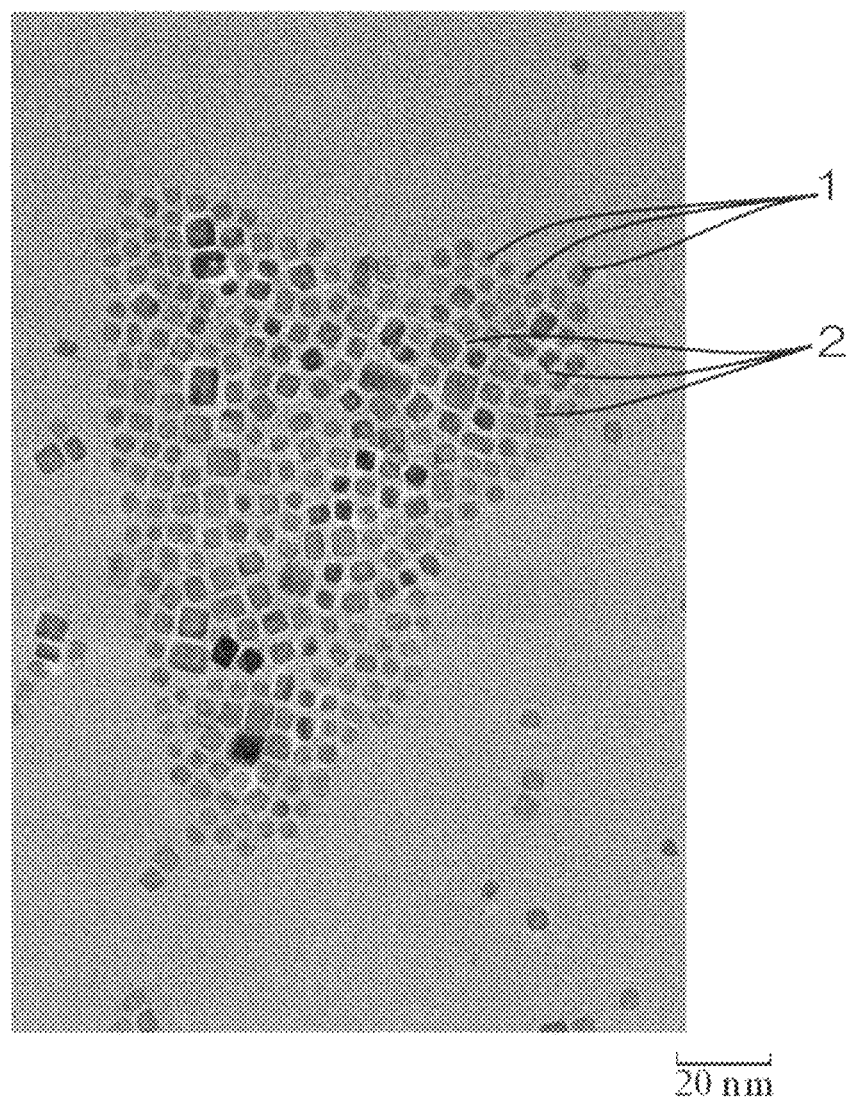
FIG. 2 shows an image-processed TEM micrograph (1,000,000 magnification) of ion conductive organic-inorganic composite particles obtained in Example 20.
Figure 3:
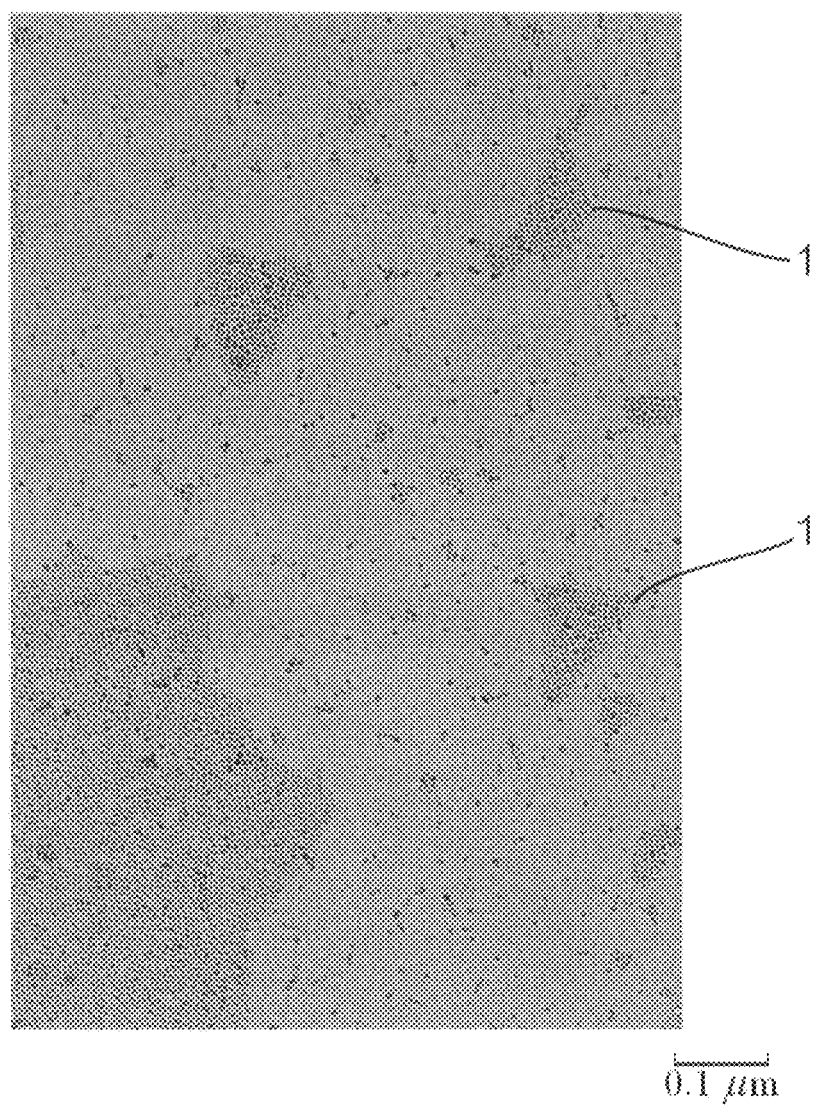
FIG. 3 shows an image-processed TEM micrograph (200,000 magnification) of ion conductive organic-inorganic composite particles obtained in Example 20.

Accordingly, as can be seen from FIGS. 1 to 3, for example, in self-assembled ion conductive organic-inorganic composite particles 1, ion-conductive paths 2 consisting of ion conductive groups are formed, and therefore the ion conductive organic-inorganic composite particles 1 can obtain ion conductivity due to the paths 2.

Also, the ion conductive organic-inorganic composite particles of the present invention have excellent dimensional stability (dimensional retentivity), and therefore a structural body consisting of the ion conductive organic-inorganic composite particles and an ion conductive molded article of the present invention in which the ion conductive organic-inorganic composite particles are mixed in a resin have excellent dimensional stability (dimensional retentivity).

Accordingly, the ion conductive molded article molded as described above reliably have excellent ion conductivity and excellent dimensional stability, and thus is suitably used as an ion conductive film.

Such an ion conductive film is used as a proton exchange membrane for a fuel cell or the like in the case where it is, for example, a proton conductive film.

Also, the ion conductive film is used as an anion exchange membrane for a fuel cell or the like in the case where it is, for example, an anion conductive film.

The ion conductive film has an ion exchange capacity of, for example, 0.01 to 10 [mmol/g], and an ion conductivity of for example, 0.1 to 500 [mS/cm]. The methods for measuring ion exchange capacity and ion conductivity will be described in detail in the examples given next.

An ion conductive molded article including the ion conductive film is used in various industrial applications including energy applications.

EXAMPLES

Hereinafter, the present invention will be described in further detail by showing Preparation Example, Examples and Comparative Examples, but the present invention is not limited thereto.

The following is a description of evaluation methods for particles (including ion conductive organic-inorganic composite particles, organic-inorganic composite particles, precursor particles and the like) and ion conductive films.
(Evaluation Methods)
<X-Ray Diffractometry (XRD)>

Particles were loaded into a glass holder and subjected to X-ray diffractometry under the following conditions. After that, from the obtained peaks, the components of the inorganic substance were assigned by database search.

X-ray diffractometer: D8 DISCOVER with GADDS, available from Bruker AXS (Optical system on incident side)
X-ray source: CuKα (λ=1.542 Å), 45 kV, 360 mA
Spectroscope (monochromator): multilayer mirror
Collimator diameter: 300 μm
(Optical System on Light-Receiving Side)
Counter: two-dimensional PSPC (Hi-STAR)
Distance between particles and counter: 15 cm
2θ=20, 50, 80 degrees, ω=10, 25, 40 degrees, Phi=0 degrees, Psi=0 degrees
Measurement time: 10 minutes
Assignment (semiquantitation software): FPM EVA, available from Bruker AXS
<Fourier Transform Infrared Spectrophotometry (FT-IR)>

Fourier transform infrared spectrophotometry was carried out on particles according to the KBr method using a fourier transform infrared spectrophotometer (FT/IR-470 Plus, available from JASCO Corporation).
<Observation with Transmission Electron Microscope (TEM)>

A particle dispersion (with a concentration of solids of 1 mass % or less) obtained by diluting particles with a solvent was applied dropwise onto a TEM grid (collodion film, carbon support film) and then dried. Then, the particles were observed with a transmission electron microscope (TEM). Along with this observation, an image analysis was performed to calculate the average particle size of the particles.

Also, the configuration (structure) of the particles were checked from the TEM image.

As a result, in addition to whether inorganic particles were not in contact with each other, or in other words, whether inorganic particles were self-assembled, the following criteria was used to evaluate the structure.

Gaps/yes: it was determined that the particles had at least a structure that had a gap between self-assemblies (between inorganic particles).

Gaps/no: it was determined that the particles had a structure in which inorganic particles were in contact with each other, or in other words, the particles were in a state in which there were no gaps between inorganic particles as a result of coagulation of the inorganic particles rather than self-assembling of the inorganic particles.

<X-Ray Photoelectron Spectroscopy (ESCA)>

A sample was prepared by molding particles into tablets using an aluminum pan and the sample was fixed to a sample stage of an ESCA apparatus (Quantum 2000, available from ULVAC-PHI, Inc.). Wide scan measurement was performed on the sample for qualitative analysis.

Subsequently, narrow scan measurement was performed on the detected peaks.

In the narrow scan measurement, peak waveform analysis of two peaks, namely, a peak of 2p spectrum of sulfur (S) and a peak derived from C—S bonds, as well as peak waveform analysis of two peaks, namely, a peak of 2p spectrum of sulfur (S) and a peak derived from S—S bonds were performed.

After that, the proportion of —$SO_xH$ group relative to thiol group (—SH) was calculated from the peak waveform analysis described above, and the —$SO_xH$ group was regarded as a sulfo group (—$SO_3H$).

<Simultaneous Thermogravimetry and Differential Thermal Measurement (TG-DTA)>

Particles were burnt in an apparatus for thermal analysis (EXSTAR 6000, available from SEIKO Inc.), and the proportion of inorganic particles relative to organic group (=inorganic particles/organic group) was calculated from the weight (mass) of the loaded particles and the weight (mass) of ash left after burning of the particles in an oxygen atmosphere.

<Gas Chromatograph Mass Spectrometry (GC-MS)>

Particles in an amount of 0.1 g and methanol in an amount of 3.17 mL were loaded into a high-pressure reactor, and the high-pressure reactor was closed with a cover and heated to 300° C. to pressurize the reactor. The reached pressure was approximately 40 MPa. They were reacted for 180 minutes after the temperature had reached the reaction temperature.

As a result, the organic group present on the surface of inorganic particles was eliminated from the inorganic particles and dissolved in methanol.

After that, 25 ml of the reacted methanol solution was transferred to a measuring flask, and methanol was added to the measuring flask (the solution was diluted). Next, the solution was filtered with a membrane filter (with a pore size of 0.25 μm), and the filtrate in an amount of 1 μl was injected into a gas chromatograph mass spectrometer (GC-MS) (7890A/5975 Cinert, available from Agilent Technologies, Inc.) and analyzed.

The amount and molecular weight of the organic group remaining on the surface of inorganic particles were thereby measured.

<Ion Exchange Capacity (IEC)>

The ion exchange capacity (IEC) of particles was calculated.

The ion exchange capacity is the amount of —$SO_3H$ group that is defined by the following equation (1) and calculated according to the following measurement method:

$$\text{Ion exchange capacity[mmol/g]}=n/Wd, \quad (1)$$

where n (acid group) is the mole amount of acid group of particles [mmol], and Wd is the mass of particles [g].

(Method for Measuring Ion Exchange Capacity)

First, particles were weighed and Wd was measured.

Next, the particles were immersed in a 3 mol/L aqueous sodium chloride solution at 60° C. for 24 hours so as to substitute the protons of acid group with sodium ions. Titration was performed on the aqueous sodium chloride solution containing protons after immersion by using an aqueous sodium hydroxide solution to determine n (acid group).

Then, Wd and n were substituted into the equation (1) given above to calculate ion exchange capacity (IEC).

<Quantification of Ion Conductive Group>

The modification amount of —$SO_3H$ group was calculated from the results obtained by IEC analysis described above.

Where necessary, modification amounts of —$SO_3H$, carboxyl and amino groups were obtained from the results obtained by ESCA, TG-DTA, FT-IR and GC-MS analyses, and the existing proportion of ion conductive group was calculated.

Specifically, the modification amount (mmol/g) per g was determined from the proportion of inorganic particles and organic group (=inorganic particles/organic group) determined by TG-DTA (Examples 15 and 17 in Table 8). Furthermore, the amount of organic substance per g and the specific surface area of inorganic particles were calculated from the average particle size determined by TEM. Furthermore, the surface coverage was calculated by assuming the exposed surface area of inorganic particles by TEM observation, determining the amount of atoms capable of binding to the binding group per g of the inorganic particles from the number of atoms that were exposed at the inorganic particle surface and capable of binding to the binding group, and determining (the amount of organic substance per g)/(the amount of atoms capable of binding to binding group).

Where necessary, the existing proportion of the ion conductive group was calculated by obtaining the modification amounts of —$SO_3H$, carboxyl and amino groups by subtracting the existing amounts of —SH and alkyl groups from the ESCA and GC results.

<Thickness of Ion Conductive Film (Film Thickness)>

The thickness of an ion conductive film (film thickness) was measured with a thickness measuring instrument (dial thickness gauge G-6C, minimum reading: 1/1000 mm, gauge head diameter: 5 mm, available from Ozaki MFG. Co., Ltd.) at a temperature of 25±2° C. and a humidity of 65±20% RH.

<Measurement of Proton Conductivity of Ion Conductive Film (AC Impedance Method)>

An ion conductive film (5) was immersed in water for one hour to swell the ion conductive film (5) and then sandwiched by two platinum foil electrodes (3) as shown in FIG. 4, and thereby a sample (4) was produced. When sandwiching the ion conductive film (5), the flat plate platinum electrodes (3) having a width of 10 mm were spaced apart 10 mm when projected in the thickness direction.

After that, the resistance (impedance) of the ion conductive film (5) was measured by an LCR meter (8). The impedance was measured in the frequency range from 10 kHz to 1 MHz. The real part of the measured impedance was plotted on the horizontal axis, the absolute value of the imaginary part was plotted on the vertical axis, and the value of the smallest real part was defined as resistance R ($\Omega$).

The proton conductivity $\sigma$ [mS/cm] on a film-thickness basis was calculated by the following equation, where the thickness of the swelled ion conductive film (5) was represented by t [cm], the width was represented by h [cm], and the interval (distance) between the platinum electrodes (3) was represented by L [cm]:

$$\sigma = L/(R \times t \times h).$$

<Dimensional Stability (Dimensional Retentivity) of Ion Conductive Molded Article>

An ion conductive film was immersed in water for 24 hours to give a water-containing ion conductive film. The water-containing ion conductive film was dried at 80 degrees for 24 hours to give a dried ion conductive film. Then, the dimensions (length×width=area) of the water-containing ion conductive film and the dried ion conductive film were measured. In this manner, the area of each ion conductive film was calculated. Furthermore, the rate of increase before and after immersion in water was calculated by the following equation, and dimensional stability (dimensional retentivity) was evaluated based on the following criteria.

Rate of increase(%)=(area of water-containing ion conductive film)/(area of dried ion conductive film)×100−100

(Criteria)

A circle "o" was given when the rate of increase was less than 10%.

A cross "x" was given when the rate of increase was 10% or greater.

PREPARATION EXAMPLE

1. Preparation of Organic-Inorganic Composite Particles

Preparation Example 1

Cerium hydroxide ($Ce(OH)_4$, available from Wako Pure Chemical Industries, Ltd.), decanoic acid, hexanoic acid and pure water were loaded into a 5 mL high-pressure reactor (SHR-R6-500, available from AKICO Corporation) according to the formulation presented in Table 1.

Next, the high-pressure reactor was closed with a cover and heated to 200° C. to pressurize the reactor. The reached pressure was approximately 10 MPa. They were reacted for 180 minutes after the temperature had reached the reaction temperature, and thereafter naturally cooled to 50° C. or lower.

Then, the pressure was released, the cover of the reactor was removed, and ethanol was added to recover the contents.

The recovered product was separated into a precipitate (reaction product) and a supernatant by performing centrifugal separation at 12000 G for 10 minutes using a centrifuge (trade name: HP-26XP, available from Beckman Coulter, Inc.), and the precipitated product was dispersed by adding 5 ml of ethanol (washing step). This washing step was repeated 5 times. After that, ethanol in the precipitate was dried at 80° C., and thereby organic-inorganic composite particles in which a decyl group and a hexyl group were present on the surface of cerium oxide ($CeO_2$) were obtained.

Next, 300 mL of hexane was added to the dried organic-inorganic composite particles, and the resulting mixture was subjected to centrifugal separation performed in a centrifuge (trade name: MX-301, available from Tomy Seiko Co., Ltd.) at 10000 G and 4° C. for 5 minutes so as to recover a supernatant.

Next, the recovered supernatant (particle-dispersed hexane solution) was filtrated by using a 0.45 µm filter to remove a coarse product, and then dried to give organic-inorganic composite particles.

The formulation and high temperature treatment conditions of Preparation Example 1 are presented in Table 1.

TABLE 1

| | Formulation | | | | | |
|---|---|---|---|---|---|---|
| | Inorganic substance | | Organic compound | | | Water |
| Preparation Example | | Amount (g) | | Amount (mL) | | Amount (mL) | Amount (mL) |
| Preparation Example 1 | $Ce(OH)_4$ | 92 | Hexanoic acid | 13.6 | Decanoic acid | 21.6 | 386 |

| | High temperature treatment conditions | | | | | | |
|---|---|---|---|---|---|---|---|
| | | | Reaction | Organic-inorganic composite particles | | | |
| Preparation Example | Temp. (° C.) | Pressure (MPa) | time (min) | Average particle size (nm) | Inorganic particles | Ion conductive group | Precursor group |
| Preparation Example 1 | 200 | 10 | 180 | 6 | $CeO_2$ | — | — |

2. Preparation of Ion Conductive Organic-Inorganic Composite Particles Example 1

Cerium hydroxide (Ce(OH)$_4$, available from Wako Pure Chemical Industries, Ltd.), DL-α-lipoic acid and a 3 mass % hydrogen peroxide solution were loaded into 5 mL high-pressure reactor (SHR-R6-500, available from AKICO Corporation) according to the formulation presented in Table 2.

Next, the high-pressure reactor was closed with a cover and heated to 400° C. in a shaking furnace (available from AKICO Corporation). The high-pressure reactor was shaken for 10 minutes for hydrothermal synthesis while the inside of the high-pressure reactor was pressurized to about 30 MPa.

After that, the high-pressure reactor was plunged into cold water for quenching.

Next, ethanol was added, and the mixture was stirred and subjected to centrifugal separation performed in a centrifuge (trade name: MX-301, available from Tomy Seiko Co., Ltd.) at 15000 G for 20 minutes to separate a precipitate (reaction product) from a supernatant (washing step). This washing operation was repeated 5 times. Ethanol in the precipitate was dried at 80° C. by application of heat.

Next, the dried particles and hexane were loaded into a screw vial and subjected to centrifugal separation performed in a centrifuge (trade name: MX-301, Available from Tomy Seiko Co., Ltd.) at 4000 G for 5 minutes to separate into a supernatant and a precipitate. After that, the supernatant was recovered, and thereby ion conductive organic-inorganic composite particles (or precursor particles) in which a 5,7-disulfoheptyl group (ion conductive group: 2 sulfo groups) was present on the surface of cerium oxide (CeO$_2$) were obtained.

Examples 7 to 18 and 27

Ion conductive organic-inorganic composite particles were prepared in the same manner as in Example 1, except that the formulation and the high temperature treatment conditions were changed to those presented in Tables 2, 3 and 5.

2. Preparation of Precursor Particles

Examples 2 to 6, 19 to 28 and 30 to 35

Precursor particles were prepared in the same manner as in Example 1, except that the formulation of respective components were changed to those presented in Tables 2, 4 and 5.

TABLE 2

| Example | Inorganic substance | Amount (g) | Organic compound | Amount (mL) | | Amount (mL) | Oxidizing agent | Amount (mL) | Water Amount (mL) |
|---|---|---|---|---|---|---|---|---|---|
| Ex. 1 | Ce(OH)$_4$ | 0.695 | DL-α-lipoic acid | 0.270 | | | 3% H$_2$O$_2$ water | 1.52 | — |
| Ex. 2 | | 1.000 | | 0.913 | | | — | | 2.63 |
| Ex. 3 | | 0.920 | | 0.456 | | | — | | 3.97 |
| Ex. 4 | | 0.695 | | 0.540 | | | — | | 2.08 |
| Ex. 5 | | 0.545 | HS—(CH$_2$)$_{10}$—COOH | 0.286 | | | — | | 2.33 |
| Ex. 6 | | 0.460 | | 0.143 | Hexanoic acid | 0.139 | — | | 4.14 |
| Ex. 7 | | 0.545 | DL-cysteic acid | 0.479 | | | — | | 2.14 |
| Ex. 8 | | 0.460 | | 0.810 | | | — | | 3.61 |
| Ex. 9 | | 0.460 | | 0.405 | | | — | | 4.02 |

| Example | High temperature treatment conditions | | | Ion conductive organic-inorganic composite particles or precursor particles | | | |
|---|---|---|---|---|---|---|---|
| | Temp. (° C.) | Pressure (MPa) | Reaction time (min) | Average particle size (nm) | Inorganic particles | Ion conductive group | Precursor group |
| Ex. 1 | 400 | 30 | 10 | 5 | CeO$_2$ | —SO$_3$H | — |
| Ex. 2 | 200 | 1.5 to 30 | 10 | 4 | | — | —S—S— |
| Ex. 3 | 200 | 30 | 10 | 4 | | | |
| Ex. 4 | 400 | 40 | 10 | 4 | | | |
| Ex. 5 | 400 | 40 | 10 | 7 | | — | —SH |
| Ex. 6 | 200 | 30 | 10 | 4 | | | |
| Ex. 7 | 400 | 40 | 10 | 7 | | —SO$_3$H | — |
| Ex. 8 | 200 | 30 | 10 | 7 | | | |
| Ex. 9 | 200 | 30 | 10 | 5 | | | |

TABLE 3

| Example | Inorganic substance | Amount (g) | Organic compound | Amount (mL) | | Amount (mL) |
|---|---|---|---|---|---|---|
| Ex. 10 | 2-Hydroxyoctanoic acid titanate | 0.5 | 10-(Diethoxy-phosphonyl)decanoic acid ethyl ester | 0.264 | Octylphosphonic acid diethyl ester | 0.066 |

TABLE 3-continued

| | | | | | | |
|---|---|---|---|---|---|---|
| Ex. 11 | | | 0.5 | | 0.088 | 3-(Diethoxy-phosphonyl)ethyl propionic acid ester | 0.062 |
| Ex. 12 | | | 0.5 | | 0.176 | | 0.125 |
| Ex. 13 | | | 0.5 | | 0.440 | — | |
| Ex. 14 | Aqueous | | 2 | | 0.440 | — | |
| Ex. 15 | titanium(IV)bis(ammonium | | 2 | | 0.632 | — | |
| Ex. 16 | lactato)dihydroxide solution *1 | | 1 | | 0.733 | — | |
| Ex. 17 | Ce(OH)$_4$ | | 1 | 6-Aminohexanoic acid | 0.286 | — | |
| Ex. 18 | | | 0.48 | 6-Aminohexanoic acid | 0.145 | Hexanoic acid | 0.139 |

| | Formulation | | High temperature treatment conditions | | | Ion conductive organic-inorganic composite particles | | | |
|---|---|---|---|---|---|---|---|---|---|
| | Organic compound | Water | | | | Average | | Ion | |
| Example | Amount (mL) | Amount (mL) | Temp. (° C.) | Pressure (MPa) | Reaction time (min) | particle size (nm) | Inorganic particles | conductive group | Precursor group |
| Ex. 10 | Decylphosphonic acid diethyl ester | 0.073 | 2.21 | 400 | 40 | 10 | 7 | TiO$_2$ | —COOH | — |
| Ex. 11 | | 0.218 | 2.25 | 400 | 40 | 10 | 8 | | | |
| Ex. 12 | — | 2.32 | 400 | 40 | 10 | 10 | | | |
| Ex. 13 | — | 2.18 | 400 | 40 | 10 | 4 to 20 | | | |
| Ex. 14 | — | 1.92 | 200 | 10 | 10 | 3 | | | |
| Ex. 15 | — | 0.94 | 300 | 10 | 10 | 5 | | | |
| Ex. 16 | — | 2.62 | 200 | 10 | 10 | 5 | | | |
| Ex. 17 | — | 3.72 | 200 | 10 | 10 | 7 | CeO$_2$ | —NH$_2$ | — |
| Ex. 18 | — | 3.99 | 200 | 30 | 10 | 4 | | | |

*1: Concentration of solids of 50 mass %

TABLE 4

| | Formulation | | | | | | |
|---|---|---|---|---|---|---|---|
| | Inorganic substance | | Organic compound | | | | Water |
| Example | | Amount (g) | | Amount (mL) | | Amount (mL) | Amount (mL) |
| Ex. 19 | Ce(OH)$_4$ | 0.545 | 6-Phenylhexanoic acid | 0.126 | — | | 2.49 |
| Ex. 20 | | 1.090 | | 0.488 | — | | 2.13 |
| Ex. 21 | | 0.545 | Benzoic acid | 0.160 (g) | — | | 2.46 |
| Ex. 22 | | 1.090 | 6-Phenylhexanoic acid | 0.488 | Benzoic acid | 0.320 (g) | 1.81 |
| Ex. 23 | | 0.545 | | 0.098 | Hexanoic acid | 0.262 | 2.26 |
| Ex. 24 | | 0.055 | | 0.122 | Decanoic acid | 0.130 | 2.36 |
| Ex. 25 | | 1.090 | | 0.488 | 3,3-Diphenyl propionic acid | 0.592 (g) | 1.54 |
| Ex. 26 | BaSO$_4$ | 0.500 | | 0.350 | — | | 3.40 |

| | High temperature treatment conditions | | | Ion conductive organic-inorganic composite particles or precursor particles | | | | |
|---|---|---|---|---|---|---|---|---|
| Example | Temp. (° C.) | Pressure (MPa) | Reaction time (min) | Average particle size (nm) | Inorganic particles | Ion conductive group | Precursor group | |
| Ex. 19 | 400 | 40 | 10 | 10 | CeO$_2$ | — | Phenylhexyl | — |
| Ex. 20 | 400 | 40 | 10 | 6 | | — | | |
| Ex. 21 | 400 | 40 | 10 | 14 | | — | Phenyl | |
| Ex. 22 | 400 | 40 | 10 | 4 to 8 | | — | Phenylhexyl | Phenyl |
| Ex. 23 | 400 | 40 | 10 | 14 | | — | | |
| Ex. 24 | 400 | 40 | 10 | 4 to 14 | | — | | |
| Ex. 25 | 400 | 40 | 10 | 6 | | — | | Diphenylpropyl |
| Ex. 26 | 300 | 30 | 10 | 30 to 80 | BaSO$_4$ | — | | — |

TABLE 5

| | Formulation | | | | | | |
|---|---|---|---|---|---|---|---|
| | Inorganic substance | | Organic compound | | Oxidizing agent | | Water |
| Example | | Amount (g) | | Amount (mL) | | Amount (mL) | Amount (mL) |
| Ex. 27 | Organic-inorganic | 0.5 | DL-α-lipoic acid | 0.342 | — | | 4.08 |
| Ex. 28 | composite | 0.5 | | 0.456 | — | | 3.97 |
| Ex. 29 | particles | 1 | | 0.913 | 3% $H_2O_2$ water | 2.63 | 0 |
| Ex. 30 | (Preparation | 1 | | 0.913 | — | | 2.63 |
| Ex. 31 | Example 1) | 1 | | 0.913 | — | | 2.63 |
| Ex. 32 | | 0.5 | HS—$(CH_2)_{10}$—COOH | 0.241 | — | | 4.18 |
| Ex. 33 | | 0.5 | | 0.286 | — | | 2.33 |
| Ex. 34 | | 0.5 | | 0.483 | — | | 3.94 |
| Ex. 35 | | 0.5 | | 0.571 | — | | 2.05 |

| | High temperature treatment conditions | | | Ion conductive organic-inorganic composite particles or precursor particles | | | |
|---|---|---|---|---|---|---|---|
| Example | Temp. (°C.) | Pressure (MPa) | Reaction time (min) | Average particle size (nm) | Inorganic particles | Ion conductive group | Precursor group |
| Ex. 27 | 200 | 30 | 10 | 5 | $CeO_2$ | — | —S—S— |
| Ex. 28 | 200 | 30 | 10 | 4 | | — | |
| Ex. 29 | 200 | 30 | 10 | 5 | | —$SO_3CH$ | — |
| Ex. 30 | 200 | 30 | 10 | 5 | | — | —S—S— |
| Ex. 31 | 200 | 30 | 60 | 5 | | — | |
| Ex. 32 | 200 | 30 | 10 | 4 | | — | —SH |
| Ex. 33 | 400 | 40 | 10 | 5 | | — | |
| Ex. 34 | 200 | 30 | 10 | 4 | | — | |
| Ex. 35 | 400 | 40 | 10 | 4 | | — | |

3. Sulfonation of Precursor Particles

Examples 36 to 69

Ion conductive organic-inorganic composite particles of Examples 36 to 69 were prepared by sulfonating precursor particles or ion conductive organic-inorganic composite particles according to the formulation and reaction conditions presented in Tables 6 and 7.

Specifically, first, 0.25 g of precursor particles were dispersed in 4.75 g of a solvent (water, an aqueous solvent such as 1 M aqueous sodium hydroxide, or an organic solvent such as acetonitrile, dichloromethane, orthodichlorobenzene or DMSO) to prepare a particle dispersion. Next, the particle dispersion was blended with an oxidizing agent or sulfonating agent in an amount presented in Tables 6 and 7, and subjected to a high temperature treatment under the reaction conditions presented in Tables 6 and 7 to sulfonate the precursor particles.

The ion conductive organic-inorganic composite particles of Example 36 were obtained by further sulfonating the ion conductive organic-inorganic composite particles of Example 1, and the ion conductive organic-inorganic composite particles of Example 69 were obtained by further sulfonating the ion conductive organic-inorganic composite particles of Example 36.

That is, the ion conductive organic-inorganic composite particles of Example 36 were obtained by carrying out the sulfonation reaction twice, and the ion conductive organic-inorganic composite particles of Example 69 were obtained by carrying out the sulfonation reaction three times.

TABLE 6

| | Formulation | | | | | | | | | |
|---|---|---|---|---|---|---|---|---|---|---|
| | Precursor particles or ion conductive organic-inorganic composite particles | | Solvent | | Oxidizing agent | | Sulfonating agent | | Reaction conditions | |
| Example | | Amount (g) | | Amount (g) | | Amount (g) | | Amount (g) | Mixing method | Reaction temperature |
| Ex. 36 | Ex. 1 | 0.25 | Acetonitrile | 4.5 | 30% $H_2O_2$ water | 0.5 | — | | Stirring | 60° C./2 h → 70° C./2 h |
| Ex. 37 | Ex. 2 | 1.5 | Water | 9.4 | 30% $H_2O_2$ water | 0.6 | | | Shaking | 70° C./5 h |
| Ex. 38 | Ex. 3 | 1.25 | Acetonitrile | 15 | 30% $H_2O_2$ water | 2.5 | | | Stirring | 60° C./2 h → 70° C./2 h |
| Ex. 39 | Ex. 4 | 1.25 | Acetonitrile | 15 | 30% $H_2O_2$ water | 2.5 | | | Stirring | 60° C./2 h → 70° C./2 h |

TABLE 6-continued

| Example | Precursor particles or ion conductive organic-inorganic composite particles | Amount (g) | Solvent | Amount (g) | Oxidizing agent | Amount (g) | Sulfonating agent | Amount (g) | Mixing method | Reaction temperature |
|---|---|---|---|---|---|---|---|---|---|---|
| Ex. 40 | Ex. 5 | 0.1 | Water | 0.96 | 30% $H_2O_2$ water | 0.04 | | | Shaking | 70° C./7 h |
| Ex. 41 | Ex. 5 | 0.1 | Water | 0.864 | 30% $H_2O_2$ water | 0.136 | | | Shaking | 70° C./5 h |
| Ex. 42 | Ex. 6 | 0.25 | Acetonitrile | 4.5 | 30% $H_2O_2$ water | 0.5 | | | Stirring | 60° C./2 h → 70° C./2 h |
| Ex. 43 | Ex. 19 | 0.05 | Dichloromethane | 4 | 30% $H_2O_2$ water | — | Chlorosulfuric acid | 0.106*[3] | Stirring | Room temp./3 h |
| Ex. 44 | Ex. 19 | 0.05 | Orthodichloro-benzene | a*[2] | — | | 1,3,5-Trimethylbenzene sulfonic acid | b*[2] | Stirring | 120° C./1 h |
| Ex. 45 | Ex. 20 | 0.25 | Dichloromethane | 29.6 | | | Chlorosulfuric acid | 0.53*[3] | Stirring | Room temp. → 50° C.*[1] |
| Ex. 46 | Ex. 21 | 0.25 | Dichloromethane | 29.6 | | | Chlorosulfuric acid | 0.53*[3] | Stirring | Room temp. → 50° C.*[1] |
| Ex. 47 | Ex. 22 | 0.25 | Dichloromethane | 29.6 | | | Chlorosulfuric acid | 0.53*[3] | Stirring | Room temp. → 50° C.*[1] |
| Ex. 48 | Ex. 23 | 0.25 | Dichloromethane | 29.6 | | | Chlorosulfuric acid | 0.53*[3] | Stirring | Room temp. → 50° C.*[1] |
| Ex. 49 | Ex. 24 | 0.25 | Dichloromethane | 29.6 | | | Chlorosulfuric acid | 0.53*[3] | Stirring | Room temp. → 50° C.*[1] |
| Ex. 50 | Ex. 25 | 0.1 | Dichloromethane | 8 | | | Chlorosulfuric acid | 0.212*[3] | Stirring | Room temp. → 50° C.*[1] |
| Ex. 51 | Ex. 26 | 0.25 | Dichloromethane | 29.6 | | | Chlorosulfuric acid | 0.53*[3] | Stirring | Room temp. → 50° C.*[1] |

*[1]Gradually increased from 50° C. over 3 hours
*[2]The total amount of a and b is 4 ml
*[3]Equivalence ratio of sulfonating agent relative to precursor particles (= (the number of moles of sulfo group in sulfonating agent)/(the number of moles of carboxyl group in precursor particles)) is 20

TABLE 7

| Example | Precursor particles or ion conductive organic-inorganic composite particles | Amount (g) | Solvent | Amount (g) | Oxidizing agent | Amount (g) | Sulfonating agent | Amount (g) | Mixing method | Reaction temperature |
|---|---|---|---|---|---|---|---|---|---|---|
| Ex. 52 | Ex. 27 | 1.25 | Acetonitrile | 15 | 30% $H_2O_2$ water | 2.5 | — | | Stirring | 60° C./2 h → 70° C./2 h |
| Ex. 53 | Ex. 28 | 0.75 | Water | 9.7 | | 0.3 | | | Shaking | 70° C./5 h |
| Ex. 54 | Ex. 28 | 1.02 | Water DMSO | 9.4 2.5 (mL) | | 0.9 | Sodium decyl sulfate | 0.3 | Shaking | 70° C./5 h |
| Ex. 55 | Ex. 29 | 1.25 | Acetonitrile | 15 | | 2.5 | — | | Stirring | 60° C./2 h → 70° C./2 h |
| Ex. 56 | Ex. 30 | 0.25 | Water | 4.8 | | 0.2 | | | Stirring | 60° C./2 h → 70° C./2 h |
| Ex. 57 | Ex. 30 | 0.25 | Water | 4.5 | | 0.5 | | | Stirring | 60° C./2 h → 70° C./2 h |
| Ex. 58 | Ex. 30 | 0.25 | 1 M aqueous NaOH | 4.5 | | 0.5 | | | Stirring | 60° C./2 h → 70° C./2 h |
| Ex. 59 | Ex. 30 | 0.25 | Acetonitrile | 4.5 | | 0.5 | | | Stirring | 60° C./2 h → 70° C./2 h |
| Ex. 60 | Ex. 30 | 0.25 | Acetonitrile | 4.5 | | 0.5 + 0.5*[1] | | | Stirring | (60° C./2 h) + (60° C./2 h)*[1] |
| Ex. 61 | Ex. 30 | 0.25 | Acetonitrile | 4.5 | | 1 | | | Stirring | 60° C./4 h |
| Ex. 62 | Ex. 30 | 0.75 | Acetonitrile | 13.5 | | 1.5 + 1.5*[2] | | | Stirring | (60° C./2 h) + (60° C./2 h)*[2] |
| Ex. 63 | Ex. 30 | 1.25 | Acetonitrile | 15 | | 2.5 | | | Stirring | 60° C./2 h → 70° C./2 h |
| Ex. 64 | Ex. 31 | 1.25 | Acetonitrile | 15 | | 2.5 | | | Stirring | 60° C./2 h → 70° C./2 h |
| Ex. 65 | Ex. 32 | 0.25 | Acetonitrile | 4.5 | | 0.5 | | | Stirring | 60° C./2 h → 70° C./2 h |
| Ex. 66 | Ex. 33 | 0.25 | Acetonitrile | 4.5 | | 0.5 | | | Stirring | 60° C./2 h → 70° C./2 h |
| Ex. 67 | Ex. 34 | 1.5 | Water | 9.5 | | 0.5 | | | Shaking | 70° C./5 h |
| Ex. 68 | Ex. 35 | 0.25 | Acetonitrile | 4.5 | | 0.5 | | | Stirring | 60° C./2 h → 70° C./2 h |
| Ex. 69 | Ex. 36 | 0.25 | Acetonitrile | 4.5 | | 0.5 | | | Stirring | 60° C./2 h → 70° C./2 h |

*[1]Reacted at 60° C. for 2 hours by blending 30% hydrogen peroxide in an amount of 0.5 g, and thereafter further reacted at 60° C. for 2 hours by adding 30% hydrogen peroxide in an amount of 0.5 g.
*[2]Reacted at 60° C. for 2 hours by blending 30% hydrogen peroxide in an amount of 1.5 g, and thereafter further reacted at 60° C. for 2 hours by adding 30% hydrogen peroxide in an amount of 1.5 g

4. Production of Ion Conductive Film

Example 70

First, a resin solution having a concentration of solids of 20 mass % was prepared by blending polyvinylidene fluoride resin (trade name: KF polymer W #1100, PVdF, weight average molecular weight: 280000, available from Kureha Corporation) and NMP according to the formulation presented in Table 8.

Besides this, a particle dispersion having a concentration of solids of 40 mass % was prepared by blending the ion conductive organic-inorganic composite particles of Example 41 and NMP according to the formulation presented in Table 8.

Next, the resin solution and the particle dispersion were blended according to the formulation presented in Table 8, and the mixture was then mixed (stirred) in a mortar for 5 minutes and defoamed for 2 minutes in a hybrid mixer, whereby the ion conductive organic-inorganic composite particles were dispersed in the resin solution. In this manner, a clear varnish of particle-containing resin composition was prepared.

Next, the obtained varnish was manually applied to a support plate using an applicator. After that, the solvent was dried if necessary.

Subsequently, the applied particle-containing resin composition was dried at 80° C. for an hour, and thereby a 14 μm thick ion conductive film (ion conductive molded article) was produced.

Examples 71 to 73 and Comparative Examples 1 to 6

A resin solution and a particle dispersion were separately prepared, a varnish of particle-containing resin composition was prepared, and then an ion conductive film (ion conductive molded article) was produced in the same manner as in Example 70 according to the formulations presented in Table 8.

TABLE 8

Formulation of particle-containing resin composition

| Example/Comparative Example | Particle dispersion | | | | Resin solution | | | | | |
|---|---|---|---|---|---|---|---|---|---|---|
| | Ion conductive organic-inorganic composite particles | Amount (g) | Solvent | Amount (g) | Resin 1 | Amount (g) | Resin 2 | Amount (g) | Solvent | Amount (g) |
| Ex. 70 | Ex. 41 | 0.4 | NMP | 0.6 | PVdF | 0.1 | — | — | NMP | 0.4 |
| Ex. 71 | Ex. 59 | 0.4 | NMP | 0.6 | PVdF | 0.075 | Sulfonic acid group-containing PVdF | 0.025 | NMP | 0.4 |
| Ex. 72 | Ex. 15 | 0.4 | NMP | 0.6 | PVdF | 0.075 | Sulfonic acid group-containing PVdF | 0.025 | NMP | 0.4 |
| Ex. 73 | Ex. 17 | 0.4 | NMP | 0.6 | PVdF | 0.1 | — | — | NMP | 0.4 |
| Comp. Ex. 1 | — | — | — | — | PVdF | 2 | — | — | NMP | 8 |
| Comp. Ex. 2 | — | — | — | — | PVdF | 1.5 | Sulfonic acid group-containing PVdF | 0.5 | NMP | 8 |
| Comp. Ex. 3 | CeO$_2$*[1] | 0.8 | NMP | 1.2 | PVdF | 0.2 | — | — | NMP | 0.8 |
| Comp. Ex. 4 | CeO$_2$*[1] | 0.8 | NMP | 1.2 | PVdF | 0.15 | Sulfonic acid group-containing PVdF | 0.05 | NMP | 0.8 |
| Comp. Ex. 5 | TiO$_2$*[2] | 0.8 | NMP | 1.2 | PVdF | 0.15 | Sulfonic acid group-containing PVdF | 0.05 | NMP | 0.8 |
| Comp. Ex. 6 | TiO$_2$*[2] | 0.8 | NMP | 1.2 | PVdF | 0.15 | Sulfonic acid group-containing PVdF | 0.05 | NMP | 0.8 |

| Example/Comparative Example | Evaluation of ion conductive organic-inorganic composite particles | | Evaluation of ion conductive film | | | |
|---|---|---|---|---|---|---|
| | IEC (mmol/g) | Presence of gaps | Thickness (μm) | Ion conductivity σ (mS/cm) | Type of ion conductivity | Dimensional stability |
| Ex. 70 | 0.15 | Yes | 28 | 3.21 | Cation conductivity | ○ |
| Ex. 71 | 0.13 | Yes | 10 | 4.65 | Cation conductivity | ○ |
| Ex. 72 | 0.90*[3] | Yes | 52 | 1.46 | Cation conductivity | ○ |
| Ex. 73 | 0.58*[3] | Yes | 30 | 10.85 | Anion conductivity | ○ |
| Comp. Ex. 1 | — | — | 20 | 1.85 | — | ○ |
| Comp. Ex. 2 | — | — | 14 | 5.73 | — | x |
| Comp. Ex. 3 | x | No | 37 | 2.35 | — | ○ |
| Comp. Ex. 4 | x | No | 85 | 2.05 | — | ○ |

TABLE 8-continued

| | | | | | | |
|---|---|---|---|---|---|---|
| Comp. Ex. 5 | x | No | — | — | — | o |
| Comp. Ex. 6 | x | No | 131 | 0.98 | — | o |

*[1]$CeO_2$ available from Kojundo Chemical Lab. Co., Ltd. and having an average particle size of 0.2 μm
*[2]$TiO_2$ available from Sakai Chemical Industry Co., Ltd., Trade name: SSP-25
*[3]Ion conductive group was calculated from results obtained by TG-DTA and IR measurements

6. Self-Assembly of Ion Conductive Organic-Inorganic Composite Particles

A particle dispersion was prepared by dispersing 0.1 parts by mass of ion conductive organic-inorganic composite particles in 100 parts by mass of a solvent (for example, a solvent selected as appropriate from NMP, toluene, chloroform, hexane, water, ethanol, methanol, acetone and the like) according to the formulation presented in Table 9, and the prepared particle dispersion was applied to a support plate and dried to cause ion conductive organic-inorganic composite particles to self-assemble. The resulting self-assembled ion conductive organic-inorganic composite particles were regarded as Examples 74 to 104.

The self-assembled ion conductive organic-inorganic composite particles of Examples 74 to 104 were evaluated based on the following method.

The results are presented in Table 9.

(Evaluations)
1. Evaluation of Ion Conductive Organic-Inorganic Composite Particles and Precursor Particles The following physical properties of the ion conductive organic-inorganic composite particles and the precursor particles of each of the examples and comparative examples were evaluated. The results are presented in Tables 2 to 8.
 XRD: Examples 1 to 35 (Tables 2 to 5)
 FT-IR: Examples 1 to 35 (Tables 2 to 5)
 TEM: Examples 1 to 35
 (Out of Examples 1 to 35, only the micrographs of Examples 17 and 20 are shown in FIGS. 1 to 3)
 IEC: Examples 36 to 41, 43, 46, 48, 50, 57 to 64 and 67 (Tables 8 and 9)
2. Evaluation of Ion Conductive Films The ion conductive film of each of the examples and the comparative examples was evaluated for the following physical properties. The results are presented in Tables 8 and 9.

TABLE 9

| Example | Ion conductive organic-inorganic composite particles | Evaluation of ion conductive organic-inorganic composite particles IEC (mmol/g) | Evaluation of ion conductive film | | |
|---|---|---|---|---|---|
| | | | Gaps | Type of ion conductivity | Dimensional stability |
| Ex. 74 | Ex. 1 | — | Yes | Cation conductivity | o |
| Ex. 75 | Ex. 10 | — | Yes | Cation conductivity | o |
| Ex. 76 | Ex. 11 | — | Yes | Cation conductivity | o |
| Ex. 77 | Ex. 12 | — | Yes | Cation conductivity | o |
| Ex. 78 | Ex. 13 | — | Yes | Cation conductivity | o |
| Ex. 79 | Ex. 14 | — | Yes | Cation conductivity | o |
| Ex. 80 | Ex. 16 | — | Yes | Cation conductivity | o |
| Ex. 81 | Ex. 18 | — | Yes | Anion conductivity | o |
| Ex. 82 | Ex. 27 | — | Yes | Cation conductivity | o |
| Ex. 83 | Ex. 36 | 0.088 | Yes | Cation conductivity | o |
| Ex. 84 | Ex. 37 | 0.14 | Yes | Cation conductivity | o |
| Ex. 85 | Ex. 38 | 0.184 | Yes | Cation conductivity | o |
| Ex. 86 | Ex. 39 | 0.132 | Yes | Cation conductivity | o |
| Ex. 87 | Ex. 40 | 0.083 | Yes | Cation conductivity | o |
| Ex. 88 | Ex. 42 | — | Yes | Cation conductivity | o |
| Ex. 89 | Ex. 43 | 0.064 | Yes | Cation conductivity | o |
| Ex. 90 | Ex. 44 | — | Yes | Cation conductivity | o |
| Ex. 91 | Ex. 46 | 0.059 | Yes | Cation conductivity | o |
| Ex. 92 | Ex. 48 | 0.061 | Yes | Cation conductivity | o |
| Ex. 93 | Ex. 50 | 0.083 | Yes | Cation conductivity | o |
| Ex. 94 | Ex. 53 | — | Yes | Cation conductivity | o |
| Ex. 95 | Ex. 54 | — | Yes | Cation conductivity | o |
| Ex. 96 | Ex. 57 | 0.184 | Yes | Cation conductivity | o |
| Ex. 97 | Ex. 58 | 0.092 | Yes | Cation conductivity | o |
| Ex. 98 | Ex. 59 | 0.320 | Yes | Cation conductivity | o |
| Ex. 99 | Ex. 60 | 0.063 | Yes | Cation conductivity | o |
| Ex. 100 | Ex. 61 | 0.088 | Yes | Cation conductivity | o |
| Ex. 101 | Ex. 62 | 0.047 | Yes | Cation conductivity | o |
| Ex. 102 | Ex. 63 | 0.085 | Yes | Cation conductivity | o |
| Ex. 103 | Ex. 64 | 0.076 | Yes | Cation conductivity | o |
| Ex. 104 | Ex. 67 | — | Yes | Cation conductivity | o |

Size: Examples 70 to 73, Comparative Examples 3 to 6 (Table 8)

Ion conductivity: Examples 70 to 73, Comparative Examples 3 to 6 (Table 8)

Dimensional stability: Examples 70 to 104, Comparative Examples 1 to 6 (Tables 8 and 9)

(Dimensional Retentivity)

Presence of gaps: Examples 74 to 104, Comparative Examples 1 to 6 (Table 9)

While the illustrative embodiments of the present invention are provided in the above description, they are for illustrative purposes only and not to be construed as limiting. Modification and variation of the present invention that will be obvious to those skilled in the art is to be covered by the following claims.

INDUSTRIAL APPLICABILITY

The ion conductive molded article in which ion conductive organic-inorganic composite particles are mixed in a resin is used as a proton exchange membrane for a fuel cell, an anion exchange membrane for a fuel cell or the like.

The invention claimed is:

1. Ion conductive organic-inorganic composite particles comprising inorganic oxide or sulfate particles that have an organic group bound to the surface of the inorganic particles and have at least a configuration that does not allow the inorganic particles to contact with each other by steric hindrance of the organic group, the organic group containing a binding group bound to the surface of the inorganic particles; a hydrocarbon group bound to the binding group; and an ion conductive group bound to a terminal of the hydrocarbon group opposite a terminal to which the binding group is bound, an existing proportion of the ion conductive group being 0.01 to 10 (mmol/g), wherein primary particles forming the ion conductive organic-inorganic composite particles are isotropic or anisotropic, the isotropic primary particles have an average particle size of 200 μm or less, and the anisotropic primary particles have an average maximum length of 200 μm or less, the inorganic particles are composed of one selected from the group consisting of titanium oxide, cerium oxide and barium sulfate, and the ion conductive group is at least one selected from the group consisting of a sulfo group, a carboxy group, a phosphono group and an amino group.

2. The ion conductive organic-inorganic composite particles according to claim 1, the ion conductive group being at least one selected from the group consisting of a sulfo group, a carboxyl group and a phosphono group.

3. The ion conductive organic-inorganic composite particles according to claim 1, the ion conductive group being an amino group.

4. The ion conductive organic-inorganic composite particles according to claim 1, obtained by hydrothermal synthesis.

5. A particle-containing resin composition comprising:
a resin; and
ion conductive organic-inorganic composite particles mixed in the resin, the ion conductive organic-inorganic composite particles comprising inorganic oxide or sulfate particles having an organic group bound to the surface of the inorganic particles and having at least a configuration that does not allow the inorganic particles to contact with each other by steric hindrance of the organic group, the organic group containing a binding group bound to the surface of the inorganic particles; a hydrocarbon group bound to the binding group; and an ion conductive group bound to a terminal of the hydrocarbon group opposite a terminal to which the binding group is bound, an existing proportion of the ion conductive group being 0.01 to 10 (mmol/g), wherein primary particles forming the ion conductive organic-inorganic composite particles are isotropic or anisotropic, the isotropic primary particles have an average particle size of 200 μm or less, and the anisotropic primary particles have an average maximum length of 200 μm or less, the inorganic particles are composed of one selected from the group consisting of titanium oxide, cerium oxide and barium sulfate, and the ion conductive group is at least one selected from the group consisting of a sulfo group, a carboxy group, a phosphono group and an amino group.

6. An ion conductive molded article comprising a particle-containing resin composition containing a resin and ion conductive organic-inorganic composite particles mixed in the resin, wherein the ion conductive molded article is produced by molding the particle-containing resin composition, wherein the ion conductive organic-inorganic composite particles comprise inorganic oxide or sulfate particles that have an organic group bound to the surface of the inorganic particles and have at least a configuration that does not allow the inorganic particles to contact with each other by steric hindrance of the organic group, the organic group containing a binding group bound to the surface of the inorganic particles; a hydrocarbon group bound to the binding group; and an ion conductive group bound to a terminal of the hydrocarbon group opposite a terminal to which the binding group is bound, an existing proportion of the ion conductive group is 0.01 to 10 (mmol/g), primary particles forming the ion conductive organic-inorganic composite particles are isotropic or anisotropic, the isotropic primary particles have an average particle size of 200 μm or less, and the anisotropic primary particles have an average maximum length of 200 μm or less, the inorganic particles are composed of one selected from the group consisting of titanium oxide, cerium oxide and barium sulfate, and the ion conductive group is at least one selected from the group consisting of a sulfo group, a carboxy group, a phosphono group and an amino group.

7. The ion conductive molded article according to claim 6, being an ion conductive film.

* * * * *